(12) United States Patent
Mimura et al.

(10) Patent No.: US 12,018,209 B2
(45) Date of Patent: Jun. 25, 2024

(54) VISCOELASTIC SURFACTANT FLUID COMPOSITION, AND METHOD OF USING THE SAME

(71) Applicant: MITSUBISHI GAS CHEMICAL COMPANY, INC., Chiyoda-ku (JP)

(72) Inventors: Kunitoshi Mimura, Chiyoda-ku (JP); Rigoberto C. Advincula, Shaker Heights, OH (US)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 465 days.

(21) Appl. No.: 17/046,942

(22) PCT Filed: Apr. 12, 2019

(86) PCT No.: PCT/US2019/027268
§ 371 (c)(1),
(2) Date: Oct. 12, 2020

(87) PCT Pub. No.: WO2019/200283
PCT Pub. Date: Oct. 17, 2019

(65) Prior Publication Data
US 2022/0340808 A1    Oct. 27, 2022

Related U.S. Application Data

(60) Provisional application No. 62/657,052, filed on Apr. 13, 2018.

(51) Int. Cl.
C09K 8/584 (2006.01)
C09K 8/03 (2006.01)
C09K 8/60 (2006.01)

(52) U.S. Cl.
CPC ........... *C09K 8/584* (2013.01); *C09K 8/03* (2013.01); *C09K 8/602* (2013.01); C09K 2208/10 (2013.01); C09K 2208/30 (2013.01)

(58) Field of Classification Search
CPC .......... C09K 8/03; C09K 8/602; C09K 8/584; C09K 2208/10; C09K 2208/30
See application file for complete search history.

(56) References Cited

U.S. PATENT DOCUMENTS

| 6,762,154 | B2 * | 7/2004 | Lungwitz | C09K 23/18 507/131 |
| 2005/0107265 | A1 * | 5/2005 | Sullivan | C09K 8/845 507/271 |
| 2008/0153720 | A1 * | 6/2008 | Huang | C09K 8/80 507/272 |
| 2012/0048548 | A1 | 3/2012 | Crews et al. | |
| 2016/0168443 | A1 | 7/2016 | LaFitte et al. | |

(Continued)

FOREIGN PATENT DOCUMENTS

| JP | 2019521204 | 7/2019 | |
| WO | WO-2016099841 A1 * | 6/2016 | ............ C04B 24/10 |

OTHER PUBLICATIONS

International Search Report and Written Opinion issued on Jun. 25, 2019 in PCT/US2019/027268 filed on Apr. 12, 2019.

*Primary Examiner* — Angela M DiTrani Leff
(74) *Attorney, Agent, or Firm* — Oblon, McClelland, Maier & Neustadt, L.L.P.

(57) ABSTRACT

A viscoelastic surfactant fluid composition comprising: a surfactant: a counterion: and a modified nanoparticle.

11 Claims, 24 Drawing Sheets

(56) References Cited

U.S. PATENT DOCUMENTS

2017/0015896 A1\* 1/2017 Cox ........................ C09K 8/588
2017/0327722 A1\* 11/2017 Li ............................ C09K 8/74
2017/0362495 A1 12/2017 Sangaru et al.

\* cited by examiner

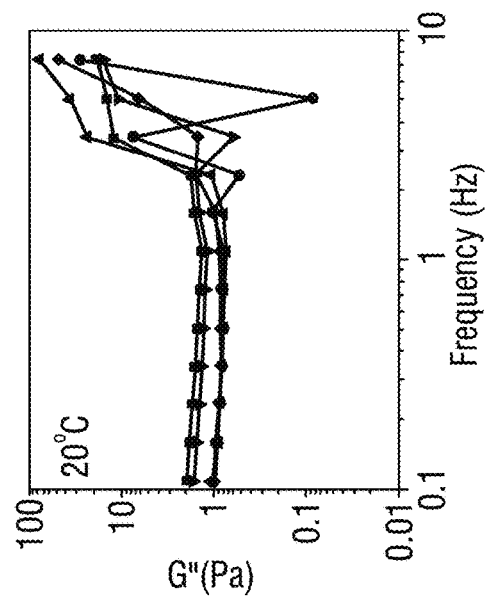
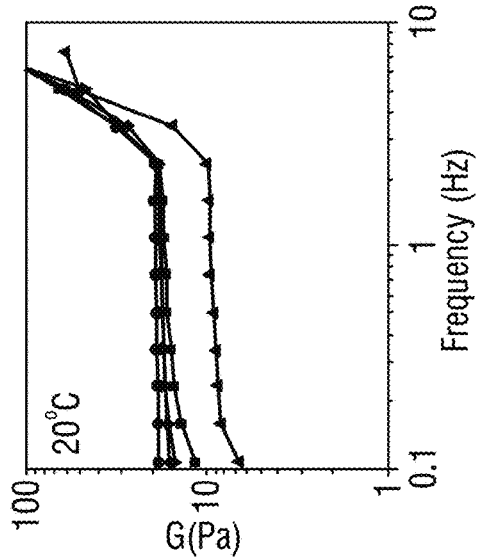
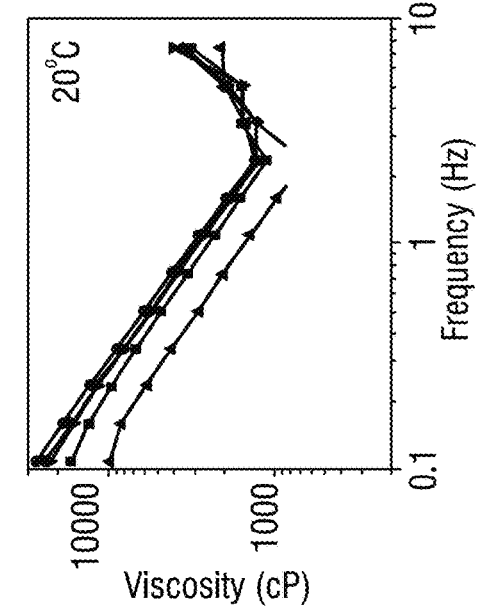
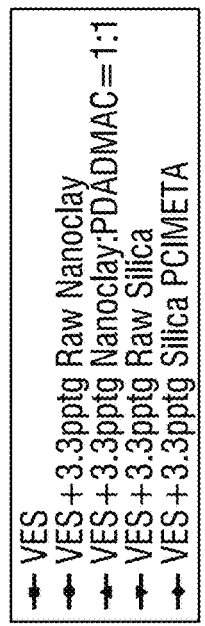
FIG. 4A   FIG. 4B   FIG. 4C

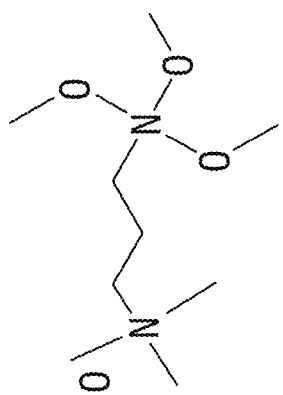
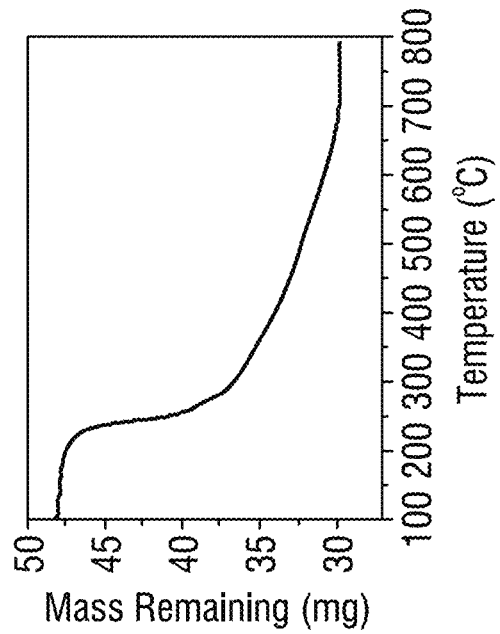
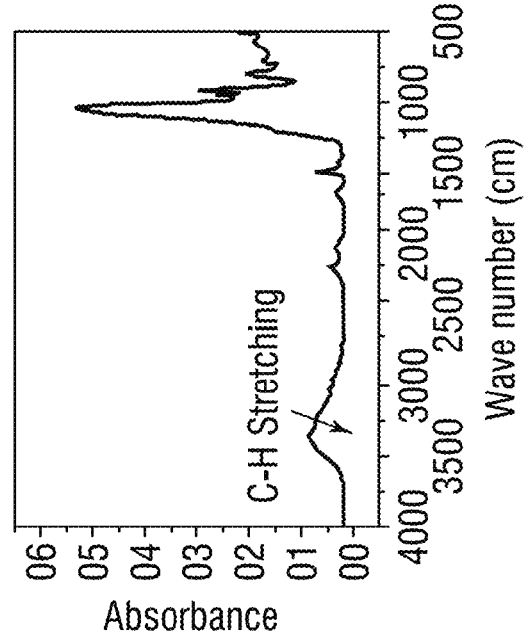
FIG. 5A
FIG. 5B
The FTIR and TGA result confirmed the successfully coated of the silane on the silica nanoparticles

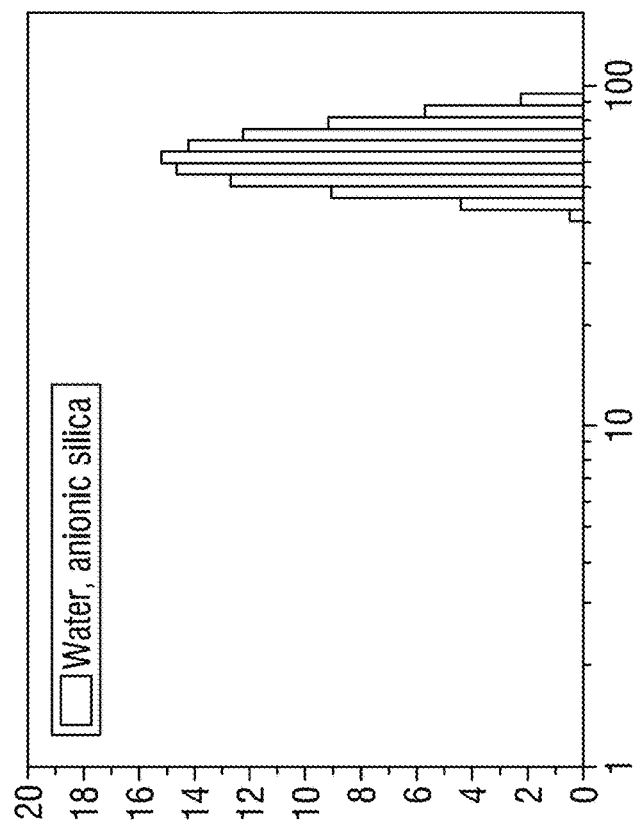
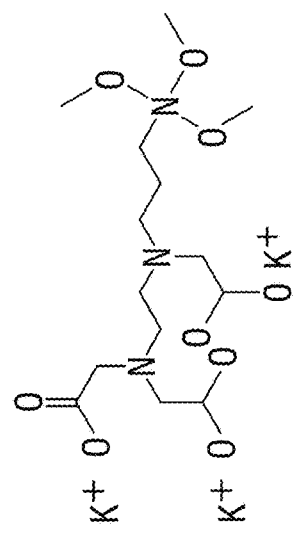
Silica 4 (−) − Negatively-charged silane coated silica
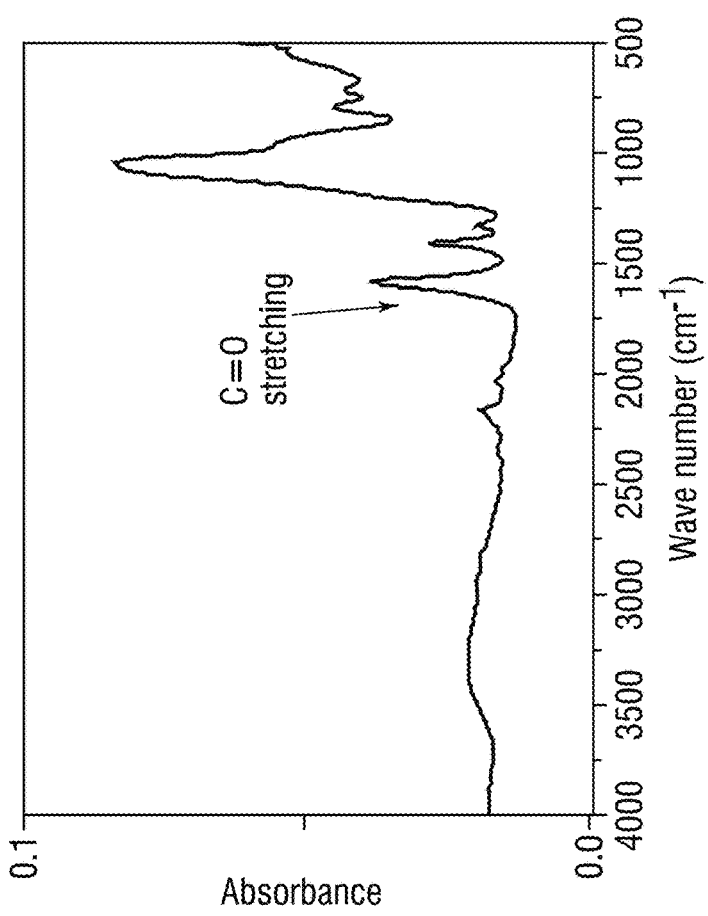
FIG. 6A
FIG. 6B

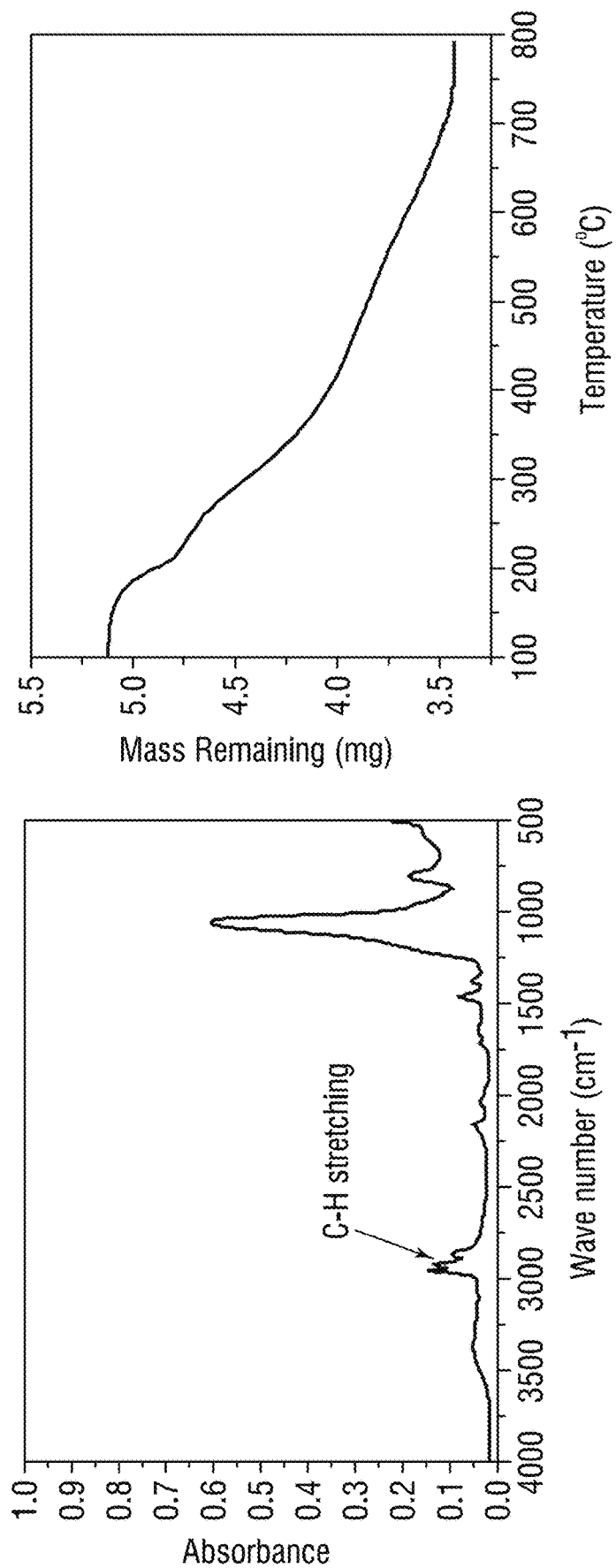
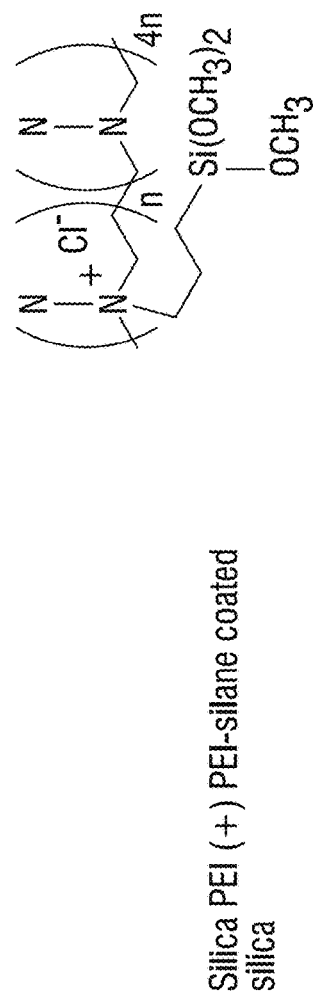
FIG. 7A
FIG. 7B

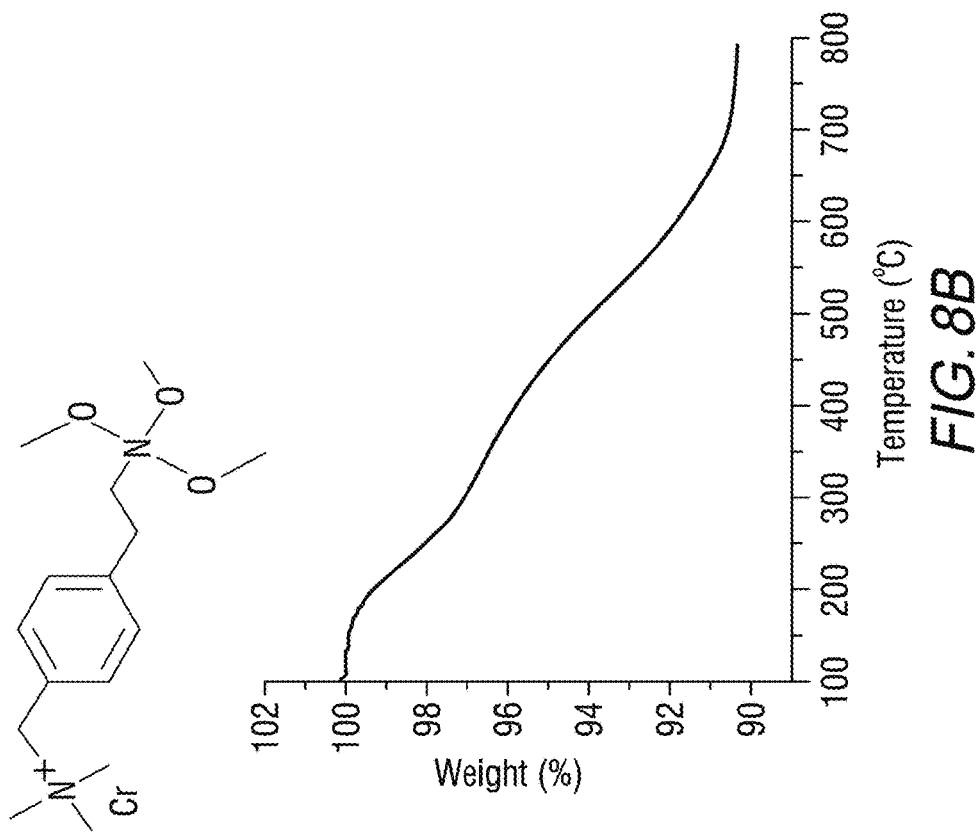
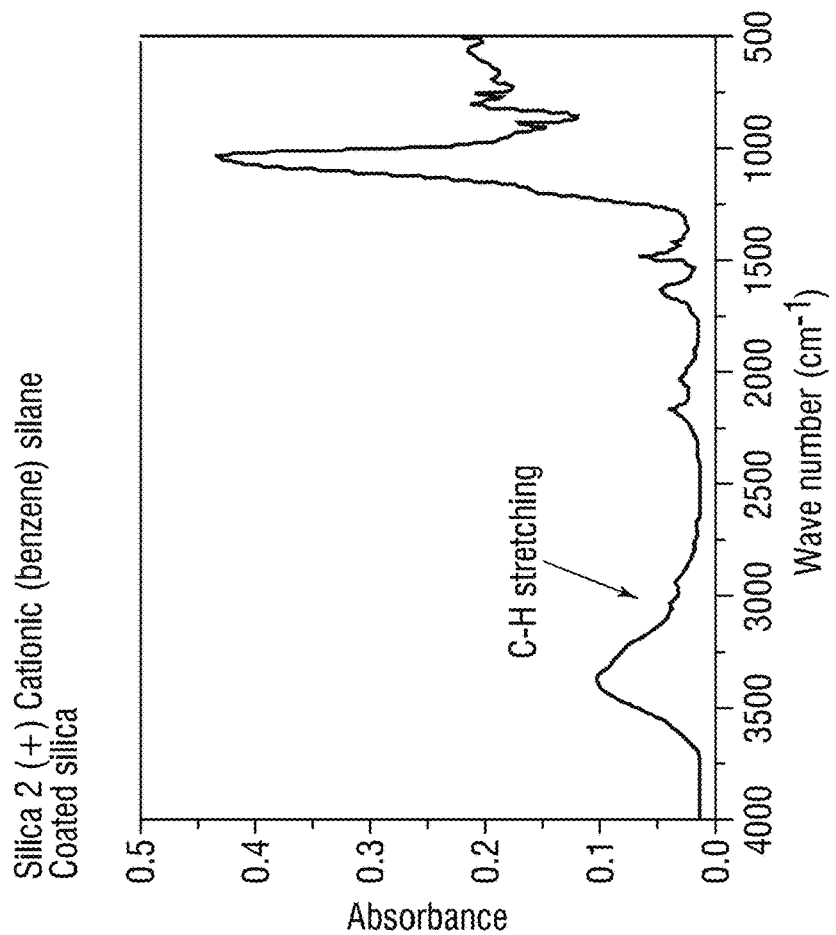
FIG. 8A
FIG. 8B

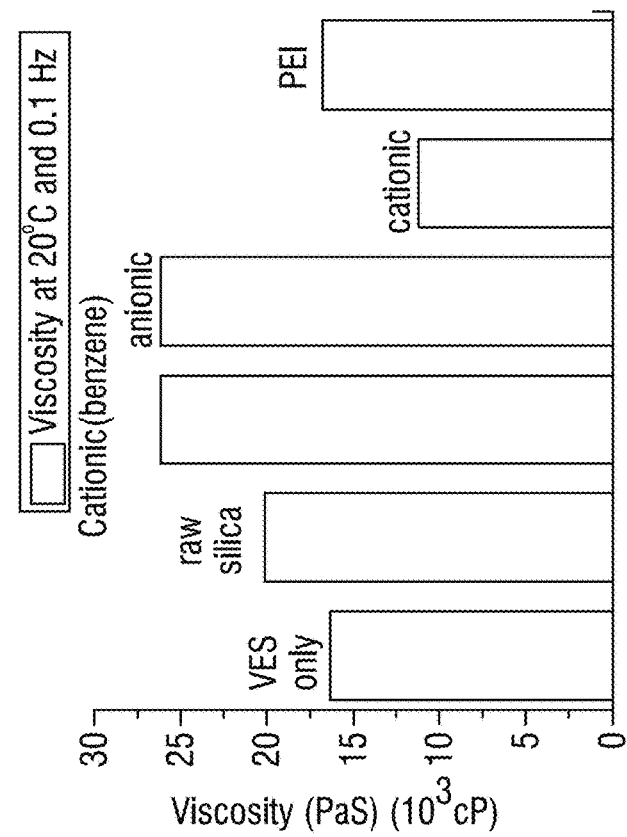
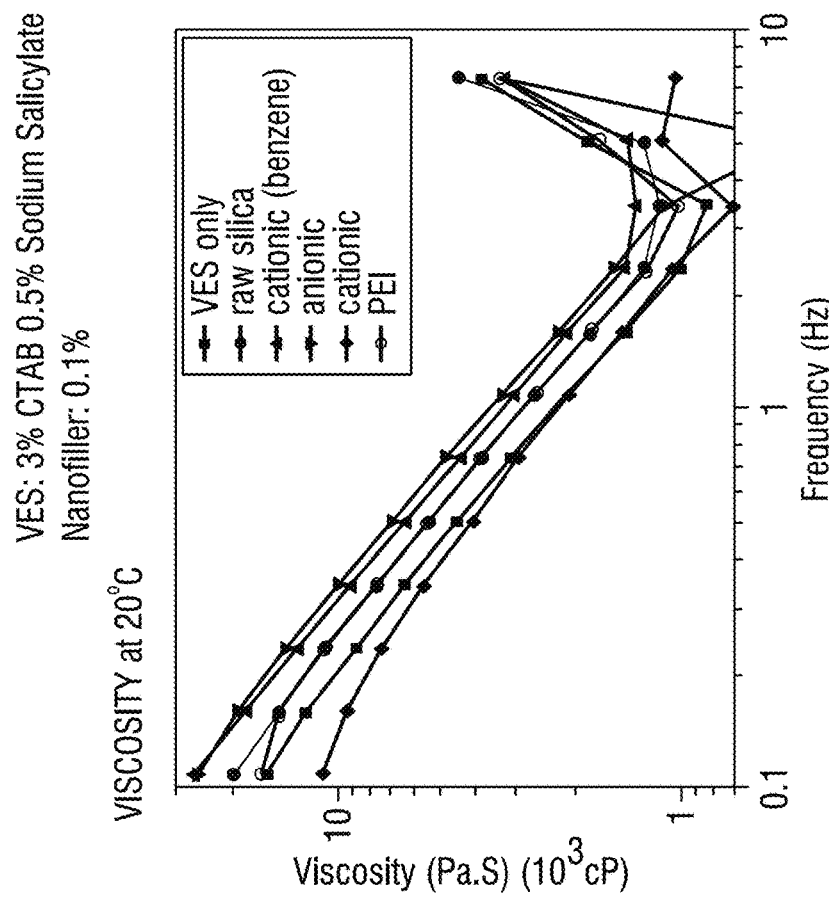
FIG. 9B
FIG. 9A

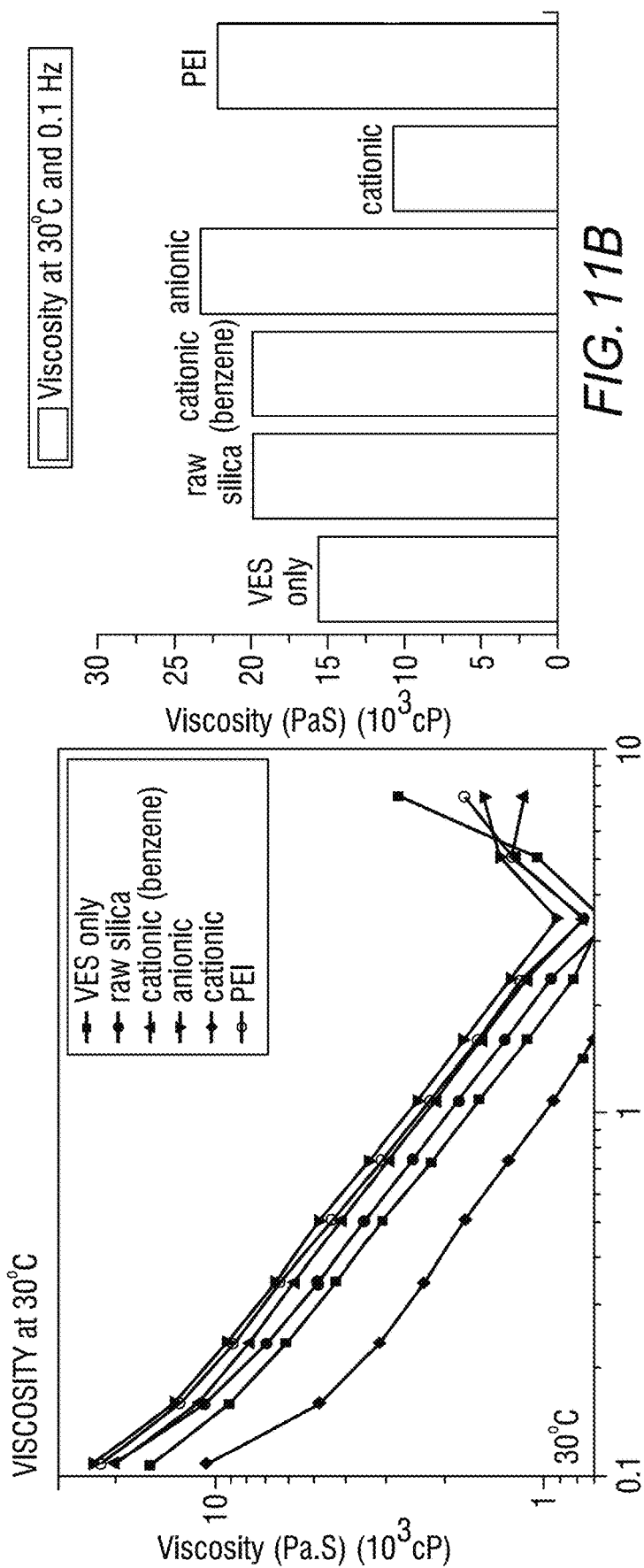

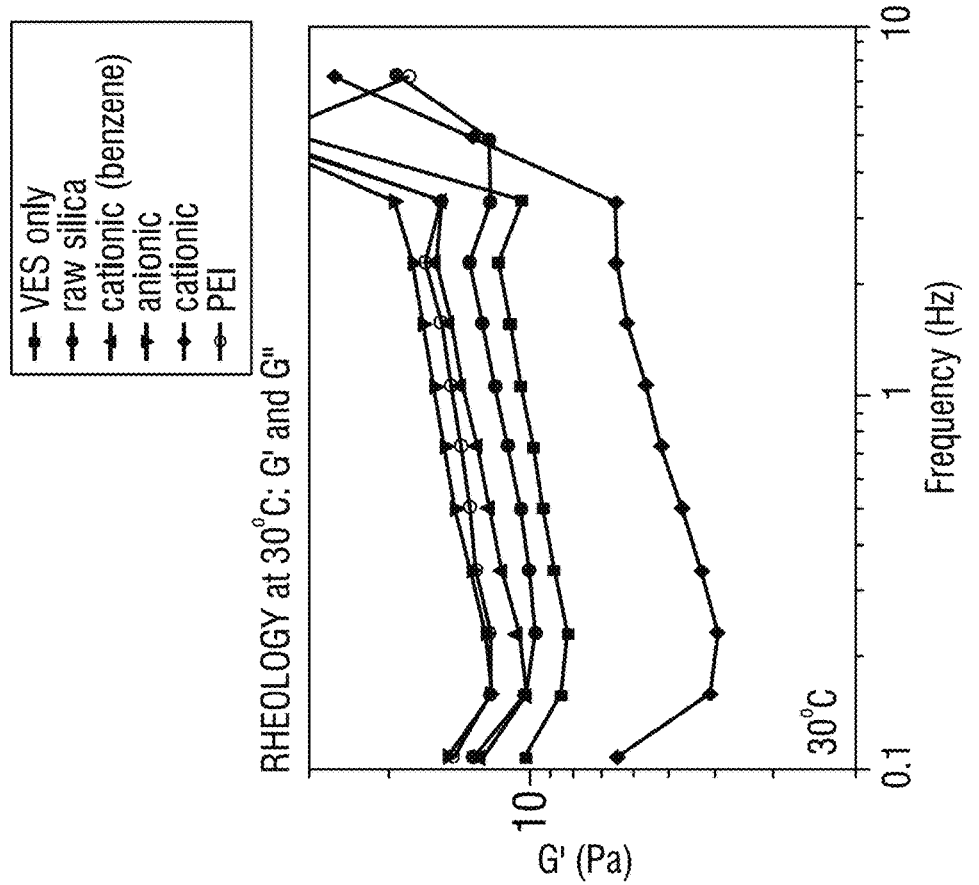
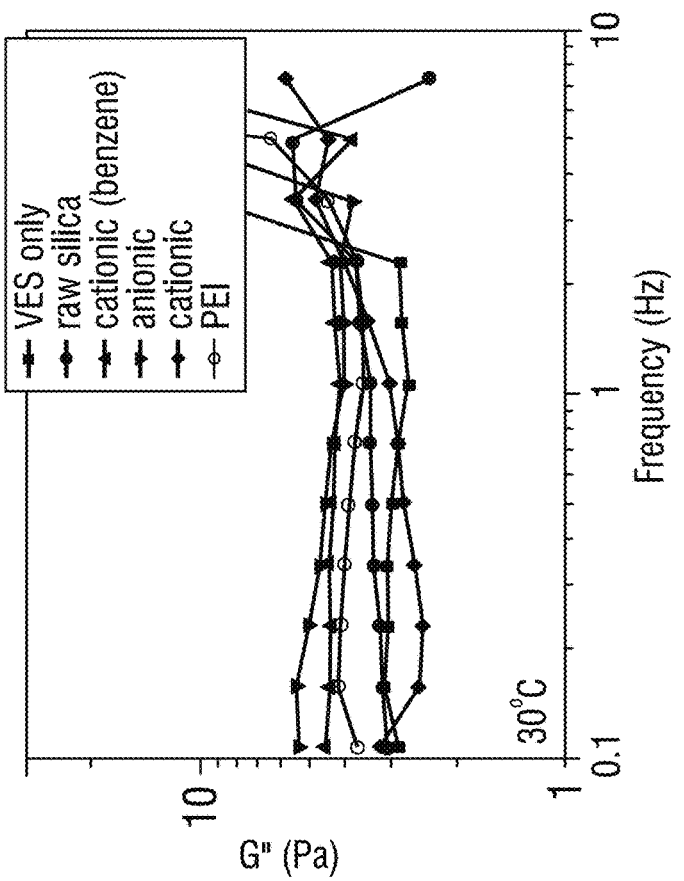
FIG. 12A
FIG. 12B

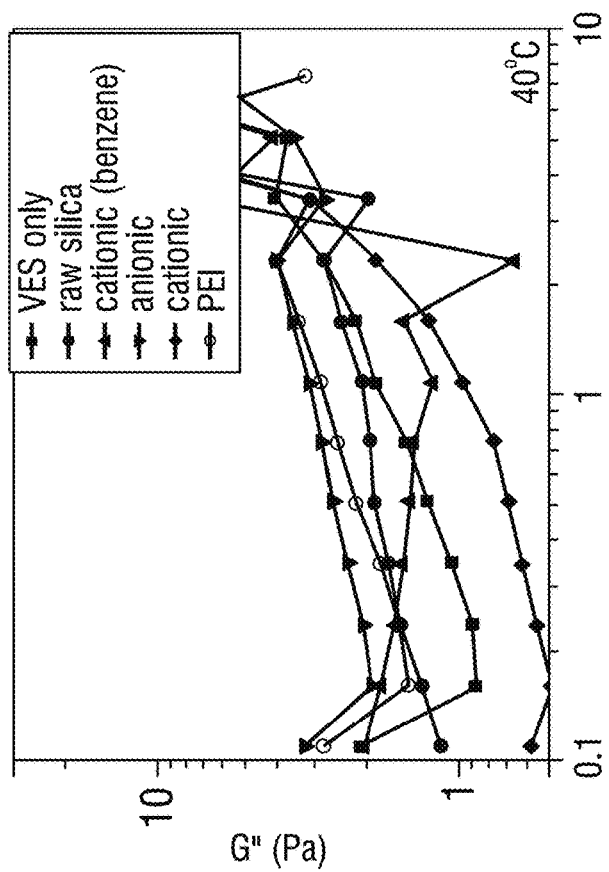
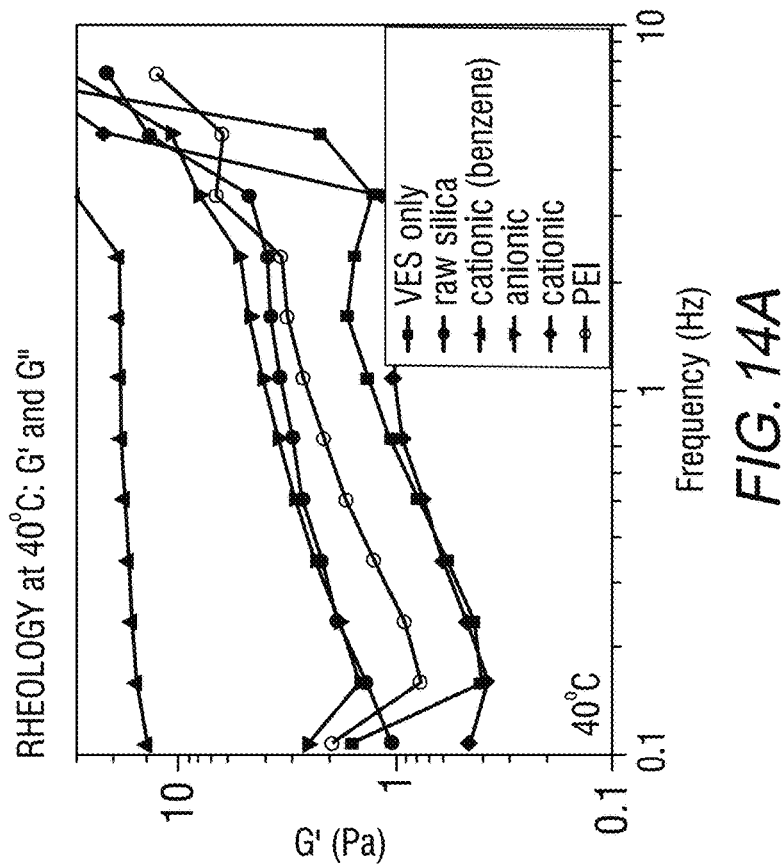
FIG. 14A
FIG. 14B

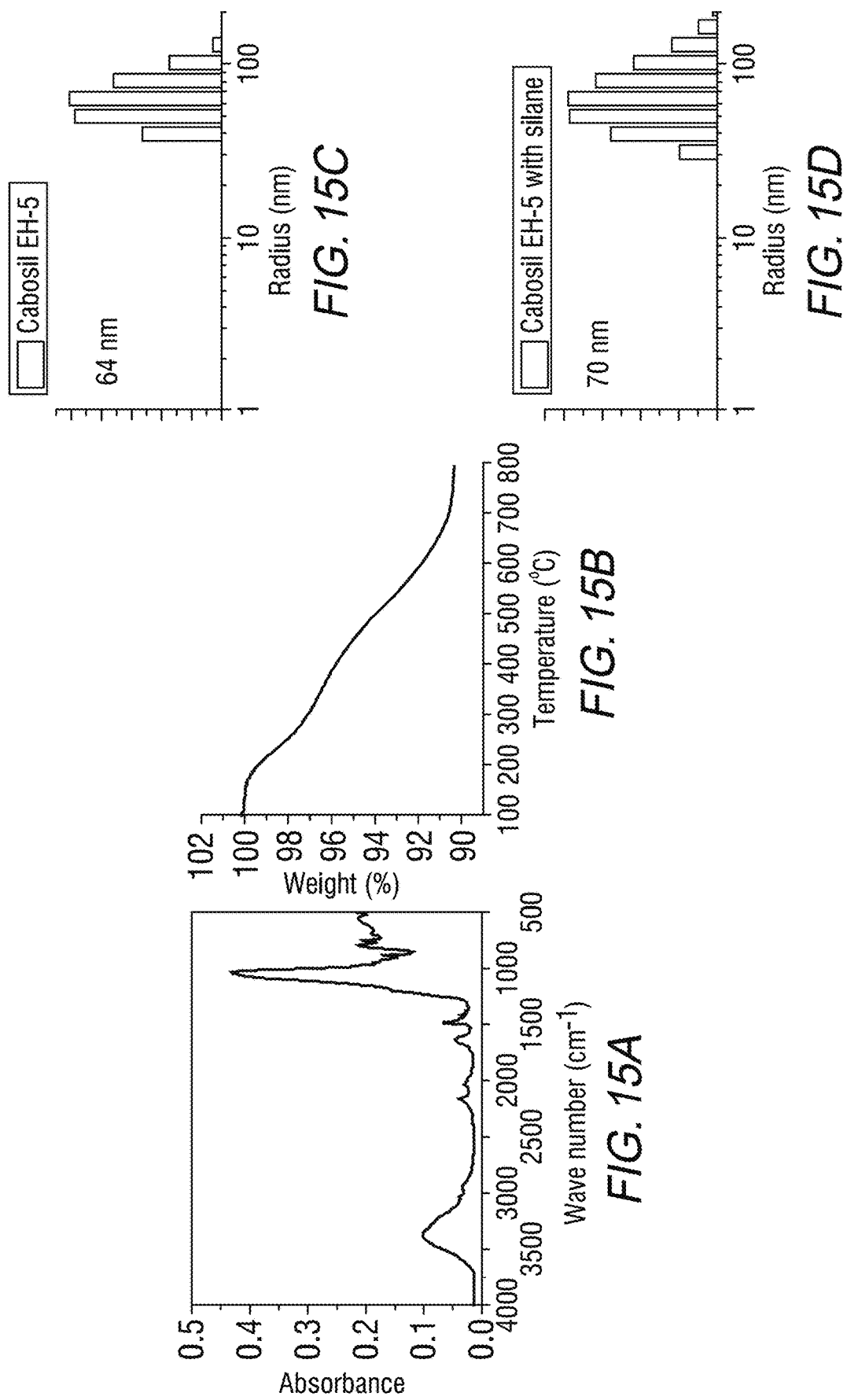

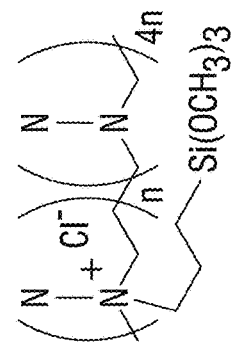
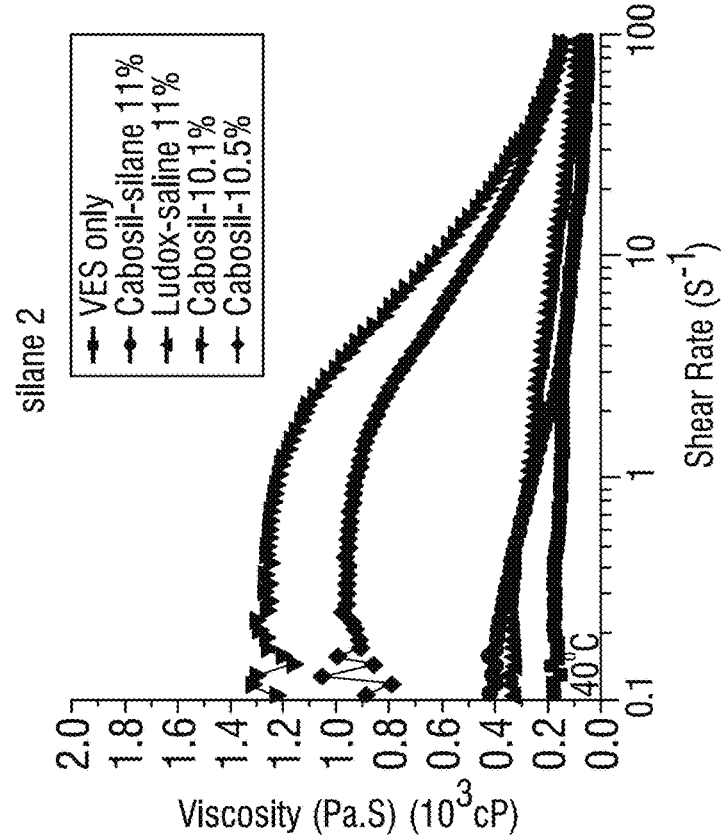
FIG. 16B
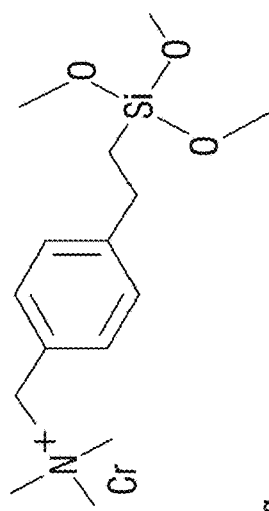
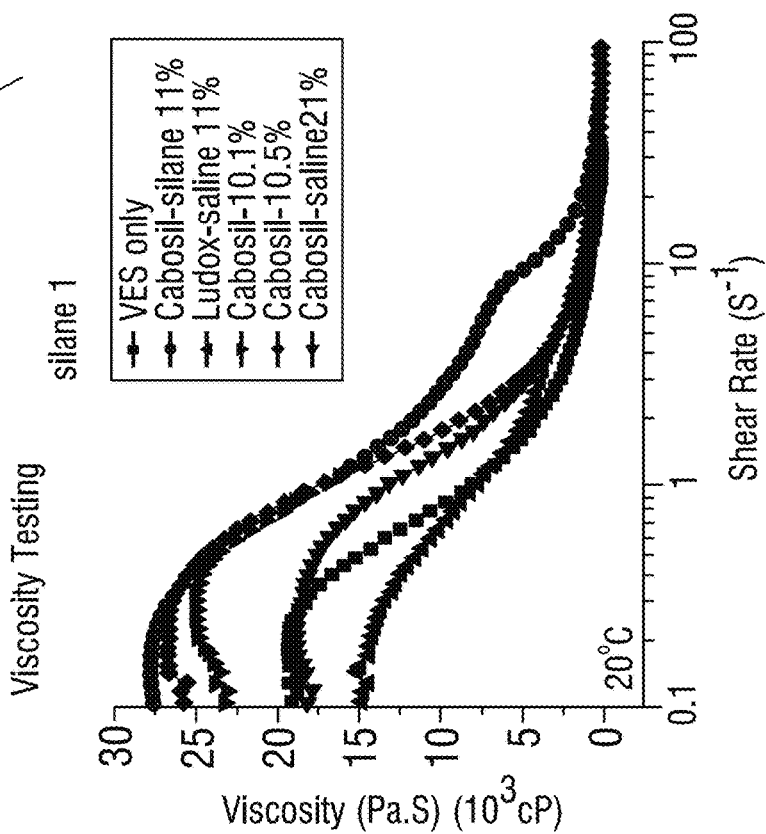
FIG. 16A

| Zeta potential | Cab-o-sil-silane | Cab-o-sil |
|---|---|---|
| Trial 1 | 0.74 | -0.39 |
| Trial 2 | 0.86 | -0.28 |
| Trial 3 | 0.72 | -0.23 |
| Trial 4 | -0.22 | -0.17 |

The Zeta potential result showed that the silica nanoparticle is functionalized by the cationic silane by changing the zeta potential from negative to positive. The trial 4 of the cab-o-sil-silane is negative because there may be some of the silica that didn't functionalized by the silane.

| Sample No. | Sample Content | Trial 1 | Trial 1 |
|---|---|---|---|
| Sample 1 | 6%Ar movis+30%CaCl2 | 15±4s | 18±6s |
| Sample 2 | 6%CTAB+1%NaSal | 12±4s | 10±4s |
| Sample 3 | 12%CTAB+2%NaSal | 17±5s | 16±4s |
| Sample 4 | 6%CTAB++30%CaCl2 | 18±4s | 18±7s |
| Sample 5 | 6%CTAB+1%NaSal + 0.5%PDADMAC | 12±3s | 11±2s |
| Sample 6 | 0.5%Crosslinked guar | 3min 40±30s | 3min 16±22s |
| Sample 7 | 6%CTAB+1%NaSal +0.1%functionalized silica | 40±30s | 30±7s |

VISCOELASTIC SURFACTANT FLUID COMPOSITION, AND METHOD OF USING THE SAME

CROSS-REFERENCE TO RELATED APPLICATIONS

The present application is a National Stage Entry of International Application No. PCT/US2019/027268, filed Apr. 12, 2019, which is based upon and claims the benefit of Priority to U.S. Provisional Application No. 62/657,052, filed Apr. 13, 2018. The entire contents of these applications are incorporated herein by reference.

BACKGROUND OF THE INVENTION

Field of the Invention

The present invention relates to a viscoelastic surfactant fluid composition applicable to well stimulation, completion fluids, drilling fluids, hydraulic fracturing fluids, acid stimulation, enhanced oil recovery (EOR), and other oilfield fluids, and a method of using the viscoelastic surfactant fluid composition.

Description of Background Art

Polymer viscosifiers were used for fracturing fluids and proppant transports during fracture treatment. Gels based on guar and polyacrylamides were used for the polymer viscosifiers.

Technical Problem

In place of polymer viscosifiers, viscoelastic surfactant (VES)-based fracturing fluids (hereinafter, occasionally referred to as "VES fluid") have been recently used for such proppant transports. Viscosity of a VES fluid is created by self-assembly of surfactant molecules in an aqueous solution or emulsion. Surfactants associate and orient to create spherical, rod-shaped and bicontinuous structures of lyotropic liquid crystalline order. Entanglement of these flexible and higher-order micelles imparts increased viscosity to the solution. Hydraulic fracturing (hereinafter, occasionally referred to as "HF") has been used for many years for completion phases in drilling and a variety of fluids have been developed over the years that can withstand the high pump rates, shear stresses, and high temperatures and high pressures the fluid is often exposed to.

Most of the fracturing fluids used today are aqueous-based gels, emulsions, or foams. In hydraulic fracturing, which is a completion stage in drilling (exploration and production), retained permeability and leak-off (fluid loss) control are two of the most important requirements. The main goal in the art is, eventually, to achieve high-conductivity proppant packs which do not damage or even lower the productivity of wells.

The use of crosslinked gels is the most predominant viscosifying medium in hydraulic fracturing operations but also in drilling. Although crosslinked gels provide good leak-off control, they are disadvantageous in that they affect the retained permeability of the proppant pack especially if all the polymers introduced are not degraded or the fluid has poor fluid loss performance. VES fluids as hydraulic fracturing fluids have been reported by a number of companies (Schlumberger, Baker Hughes, etc.) and have appeared in a number of patents. Since VES is a polymer-free composition and the viscosity is mainly achieved by control of concentrations towards higher-order micelle structures, it can be easily recovered and in most cases, does not require a breaker for control. In addition, VES can minimize fracture height growth and increase effective fracture length—which is an ultimate goal in achieving effective productivity for the hydraulic fracturing operation.

For VES fluids, the elasticity and structure rather than the viscosity of fluid are the main drivers. An important advantage is that VES fluids can efficiently transport proppants at lower viscosities with reduced friction pressure and thus reduce the energy for pumping fluids down the hole towards greater fracture lengths (horizontal), better fracture geometry control, and deeper formations. Other possible uses of VES technology include filter cake removal, selective matrix diversion, permeability preservation, and coiled tubing clean-out. Yet, there are some points to be improved in the VES-associated technology, such as 1) poor stability at high temperatures; 2) poor stability under complex brine conditions or highly salt-saturated environments; and 3) lack of viscosity-elasticity control once VES is deployed with other chemical components and additives.

In operation of the VES technology for oilfield applications, for example, a number of surfactant types and architectures can be used for formulating VES fluids, including anionic surfactants, cationic surfactants, and zwitterionic surfactants. It is necessary to create stable micelles with high-temperature stability and brine-chemistry stability. A surfactant composition that creates useful rheology within concentrations ranging from 3% to 8% can be deemed cost-effective for demanding applications. The exact surfactant concentration depends on the bottom hole temperature and desired fluid viscosity. In addition, a VES fluid can break to water-like viscosity by exposure to liquid hydrocarbons or dilution with reservoir brines. Control of viscosity can therefore be achieved with a "breaker" that is introduced rationally for control at certain stages of the hydraulic fracturing operation. An encapsulated breaker can be developed, for example, to enable viscosity modification at the right depth or stage of the process especially in dry gas wells where there is neither brine nor liquid hydrocarbon to assist the breaking process. The effectiveness of the VES and a breaker control can be measured via proppant pack conductivity tests and monitoring the retained proppant pack permeability. This can be extended towards monitoring the effect on fracture propagation length, geological well connectivity (matrix acidizing and gravel pack transport), and formation preservation, and can also be augmented in the field with tracer analysis. Another important property monitored for VES and hydraulic fracturing operation is the fluid loss property. By pressurizing the fluid flow to a controlled permeability formation (simulated in the lab with a core flooding experiment), the cumulative fluid volume flowing into the core can be measured as a function of time and the total fluid loss coefficient vs. permeabilities. The fluid loss coefficient for the VES system can then be compared to other hydraulic fracturing crosslinked polymers. In a composition for which filter cake formation is expected, the amount of filter cake residue can likewise be measured gravimetrically to quantify this performance.

SUMMARY OF THE INVENTION

Solution to Problem

<1> A viscoelastic surfactant fluid composition containing: a surfactant; a counterion; and a modified nanoparticle.

<2> The viscoelastic surfactant fluid composition according to <1>, wherein the modified nanoparticle is at least one selected from modified silica nanoparticles, modified clay nanoparticles, modified graphene nanoparticles, and modified nanocellulose nanoparticles.

<3> The viscoelastic surfactant fluid composition according to <1>, wherein the average particle size of the modified nanoparticle is 0.1 nm to 1000 nm.

<4> The viscoelastic surfactant fluid composition according to <1>, further containing an additive.

<5> A method of using a viscoelastic surfactant fluid composition, wherein the viscoelastic surfactant fluid composition according to <1> is used for at least one selected from well stimulation, a completion fluid, a drilling fluid, a hydraulic fracturing fluid, acid stimulation, and enhanced oil recovery.

Advantageous Effects of Invention

The present invention can provide a novel viscoelastic surfactant fluid composition, and a method of using the viscoelastic surfactant fluid composition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4A-4C show the results of VES enhancement study;
FIGS. 5A-5C show the results of IR, DLS and TGA studies on alkyl silane—silica 1 (+):cationic silane coated silica;
FIGS. 6A-6B show the results of IR and DLS studies on alkyl silane—silica 4 (+):anionic silane coated silica;
FIGS. 7A-7B show the results of IR and TGA studies on silica PEI (+):PEI-silane-coated silica;
FIGS. 8A-8B show the results of IR and TGA studies on silica 2 (+):cationic (benzene) silane-coated silica;
FIGS. 9A-9B show the results of rheological studies on the various samples with silane-coated silica;
FIGS. 11A-11B show viscosity studies on the various samples with silane-coated silica;
FIGS. 12A-12B show the G" behavior acquired from viscosity studies on the various samples with silane-coated silica;
FIGS. 14A-14B show the G" behavior acquired from viscosity studies on the various samples with silane-coated silica;
FIGS. 15A-15D show further studies on the cationic (benzene) silane-modified silica;
FIGS. 16A-16B show the results of viscosity measurements of the odified Carbosil silica nanoparticles and Ludox nanoparticles modified with the silane 1 or silane 2.

DETAILED DESCRIPTION OF THE EMBODIMENTS

Figure 1:
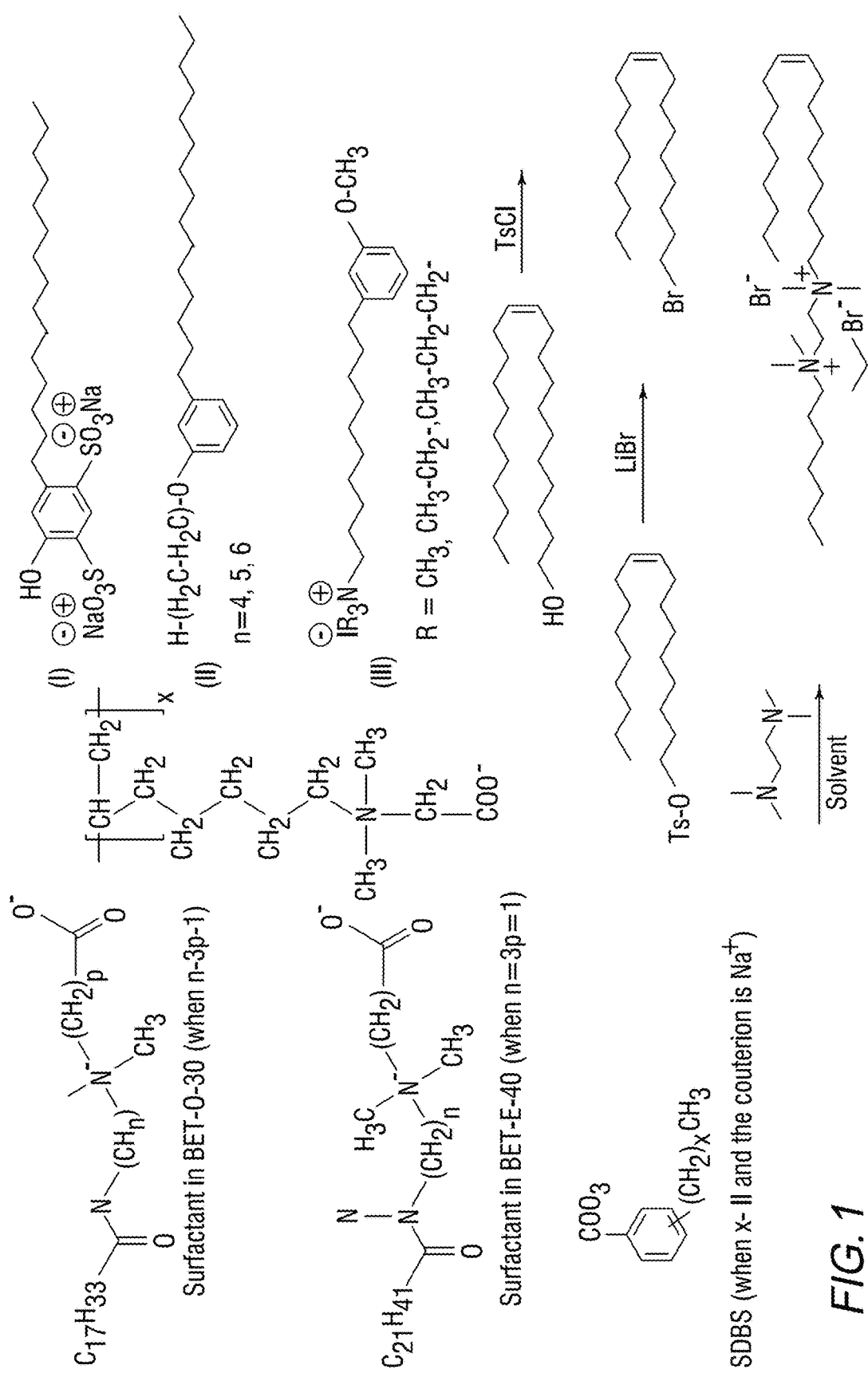
FIG. 1 shows examples of surfactants.

Now, the viscoelastic surfactant fluid composition of the present invention will be described with reference to embodiments. However, the present invention is not limited to the following embodiments.

<<Viscoelastic Surfactant Fluid Composition (VES Fluid)>>

The novel VES fluid of the present embodiment is suitable for oilfield applications, and, for example, has high hydraulic fracturing fluid performance, and is useful also for other stimulation, drilling fluids, acid treatment, enhanced oil recovery (EOR), and other oilfield applications which require a viscosified medium. The VES fluid of the present embodiment contains a modified nanoparticle, a surfactant, and a counterion as a base formulation, and a co-surfactant or the like can be contained therein, as necessary. The VES fluid of the present embodiment can contain additives to enhance cost-effectiveness and performance such as polyelectrolytes, nanoparticles, colloidal particles, functional additives, anti-corrosions, anti-scalings, viscosity regulators, and anti-oxidations.

As described above, the VES fluid of the present embodiment is a VES fluid applicable to various fluid applications in oilfield operations and capable of controlled viscosity, permeability, and density. The VES fluid can be prepared by dissolution, dilution, and dispersion methods based on a specific composition ratio (concentrations) and order of mixing such that optimized properties are achieved for a particular pressure (P), volume (V), and temperature (T), condition (PVT condition) for field operations.

In the following, the surfactant, counterion, and modified nanoparticle for the VES fluid of the present embodiment will be described, and subsequently various additives will be described.

(Surfactant)

Use of a surfactant known as a viscoelastic surfactant is preferred. Use of a viscoelastic surfactant allows preparation of a VES fluid with a lower concentration than in using other surfactants. For the surfactant, an ionic surfactant such as an anionic surfactant, a cationic surfactant, and a zwitterionic surfactant, or a nonionic surfactant can be used. They can also be designed to have a specific geometric packing parameter that is optimized for worm-like micelles, lamellar and vesicle formation.

Examples of properties desired for surfactants for the present embodiment are as follows; however, the present invention is not limited to surfactants which exert the following properties.

Stability at higher temperatures to maintain viscosity values and retain transparency or cloud point. Effect of higher concentrations, addition of salts, and addition of alcohol co-surfactants is acceptable for stabilization.

Stability in fresh water or brine conditions up to seawater.

Stability of proppant in viscous medium sufficient or comparable to guar or xanthan gum viscosifier.

VES fluid loss, specifically, achievement of lower leak-off and leak-off rates with higher permeability.

High viscosity across a wide range of temperatures, particularly at the high end of the temperature range, and at the low surfactant loading which reduces cost, which is one of desirable characteristics of the ideal VES fluid for hydraulic fracturing (HF).

HF fluids, which can contain two or more different surfactants: preferably anionic or nonionic, thereby leaving reservoir rocks water-wet for better fluid mobility through the formation.

Any surfactants which form any of spherical micelles, worm-like micelles, cylindrical micelles, and bilayers may be used; however, surfactants which form worm-like micelles or cylindrical micelles are preferred from the viewpoint of viscoelasticity.

Figures 2, 3:
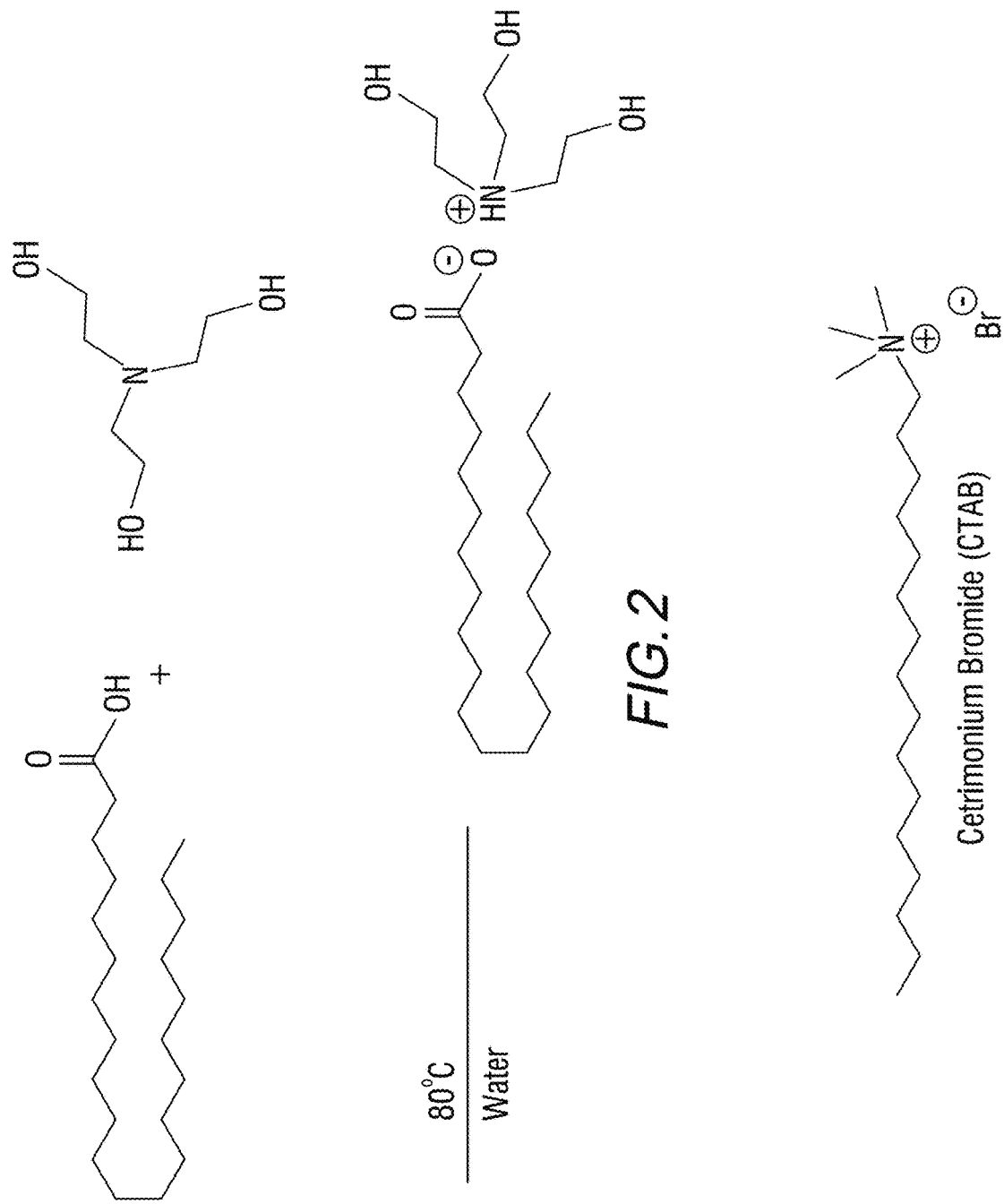
FIG. 2 shows examples of surfactants.
FIG. 3 shows an example of surfactants.

Examples of such surfactants are shown in FIGS. 1-3, and especially, hexadecyltrimethylammonium bromide (also referred to as "CTAB" or "cetrimonium chloride") is one of preferred examples.

In using the VES fluid as a hydraulic fracturing fluid, it is preferred to employ an effective amount (determine the percolation threshold) for the VES fluid. That is, it is preferred to use the least amount which in combination with the other ingredients, is sufficient to provide a viscosity high enough to achieve the desired degree of fracturing of the formation, even at formation temperatures at, or in excess of, 150° C. If a proppant (propping agent such as sand) is used together with the VES, the amount of surfactant is preferably sufficiently low to give low specific density so as to maintain proppant particles in suspension during their placement in the formation fractures. With regard to the usage of surfactants for the VES fluid, the exact quantity and specific surfactant, or combination of surfactants for a particular proppant (sand-, ceramic-, resin-coated) to be employed will vary depending on such things as the viscosity desired, the temperature of the formation, the desired pH of the solution, as well as other factors, such as the concentration of specific soluble salt (s), if any, used in the fracturing fluid composition. The concentration of the surfactant will typically range from about 1 to about 15 wt. %, preferably from about 3 to about 10 wt. %, based on the total weight of the fracturing fluid composition. Simple slurry bed height measurement procedures can be used at the beginning to determine the optimum conditions for any particular set of parameters. This will be determined for suitable proppants including gravel, sand, bauxite, glass beads, and the like with a particle size of about 20 to about 60 mesh. The resulting fluid slurry may have a weight of particulate material per gallon of slurry ranging from as low as about 1 ppg, up to about 20 ppg, preferably from about 5 ppg to about 20 ppg. "Ppg" is pounds of proppant to gallons of fracturing fluid. This property can be determined along with the presence of model additives including pH control, corrosion and scaling inhibitors, fluid loss additives, etc.

(Counterion)

A counterion preferable for relation with the above-described surfactant can be appropriately selected. The type of such a counterion is not particularly limited, and examples thereof include sodium salicylate, sodium chloride, calcium chloride, potassium bromide, and sodium naphthalene-2,3-dicarboxylate (NaNDC).

Examples of preferred combinations of a surfactant and a counterion include combination of CTAB and sodium salicylate, combination of CTAB and calcium chloride, and combination of CTAB and NaNDC.

The amount of the counterion in the VES fluid is not particularly limited, and an appropriate amount can be selected with consideration on relation with other materials to be used from the viewpoint of balance with the surfactant content, etc.

Examples of combination of a surfactant and a counterion are shown in the following; however, the present invention is not limited to the following combinations. The term "wt. %" accompanying each surfactant and counterion indicates the ratio to the total mass of the VES fluid.

Combination of 3 wt. % CTAB and 0.5 wt. % sodium salicylate

Combination of 6 wt. % CTAB and 1 wt. % sodium salicylate

Combination of 2.1 wt. % CTAB and 30 wt. % calcium chloride

Each of combinations with CTAB and salicylate is one of preferred combinations in terms of high temperature performance, low concentration, and absence of salts (which is necessary in halide counterions).

In using $CaCl_2$ (calcium chloride), the concentration (minimum usage) is preferably 20 wt. % or more to a surfactant.

Moreover, NaNDC is reported to be a strong counterion. NaNDC is capable of strongly binding to CTAB, and such strong binding between the ions can help CTAB form worm-like micelles in a reduced concentration of sodium salt. The concentration of NaNDC is also a parameter to control the microstructure of micelles. For this reason, the viscosity of CTAB solution can be increased with a concentration of 0.6 wt. % as the NaNDC concentration increases, and the NaNDC concentration is preferably 1 to 2 wt. %.

(Modified Nanoparticle)

For the VES fluid of the present embodiment, the use of the modified nanoparticle is one of important factors in differentiating from other types of VES preparation methods and in tailoring its synergistic behavior with a variety of additives and other components contained in the composition. The term "modified nanoparticle" refers to a nanoparticle obtained by subjecting the surface of an unmodified nanoparticle to modification of physical properties, introduction of a functional group, or introduction of a functional substance, etc. If the VES fluid contains a modified nanoparticle, the stability of the viscoelasticity or the like of the VES fluid can be enhanced.

The VES fluid of the present embodiment can form a complex with higher-order micelles through self-assembly of the surfactant, the counterion, and the nanoparticle. The complexed VES fluid is inferred to preferentially have a leak-off rate (fluid loss properties) which is below the leak-off rate of pure VES fluids of equivalent rheology, and this can give a significant advantage. In addition, the VES fluid of the present embodiment can be used to fracture higher-permeability formations as compared to the pure VES fluids. It is likely to occur after gel degradation by interaction with hydrocarbons. The clean-up performance of the new complex VES fluid can be similar to or better than that observed for a low-concentration linear gel polymer fracturing fluid, i.e., the clean-up is acceptable and superior to higher-concentration linear polymer fluids or covalently crosslinked polymer fluids.

The particle size of the modified nanoparticle is not particularly limited, and, for example, can be 0.1 nm to 1000 nm, and, for example, can be 1 nm to 500 nm or 1 nm to 100 nm. In the present embodiment, the cumulant average particle size can be used as the particle size of the modified nanoparticle.

The modified nanoparticle is preferably mono-dispersed. If the modified nanoparticle is aggregated, the particle size of the aggregated particle can be, for example, 0.1 nm to 1000 nm, and can be, for example, 1 nm to 100 nm.

To prepare the modified nanoparticle, a known surface treatment can be appropriately selected and performed for a desired nanoparticle. Examples of such surface treatment with the viewpoints of high activity and compatibility with surfactants include a surface grafting method, chemical adsorption, physisorption, silanization, surface-initiated polymerization, and polymerization through grafted monomers. Examples of the nanoparticle for production of the modified nanoparticle include silica nanoparticles (SNP), clay nanoparticles (CNP), graphene nanoparticles, nanocellulose nanoparticles, each of which enables the VES fluid to have strong stability, and additionally a nano-oxide (titanium dioxide), a nano-alumina, a metallic nanoparticle of zinc, gold, silver, or the like, a carbon nanotube (single-wall carbon nanotube (SWCNT), double-wall carbon nanotube (DWCNT), multi-wall carbon nanotube (MWCNT)), or graphene oxide may be used.

Examples of the modified nanoparticle for the present embodiment include modified silica nanoparticles, modified clay nanoparticles, modified graphene nanoparticles, and modified nanocellulose nanoparticles, and combinations thereof, and more specific examples include cationic benzyl silane-modified silica nanoparticles, PCIMETA-SIP-modified silica nanoparticles, and additionally cationic silane-coated silica, cationic (benzene) silane-coated silica, alkyl silane-silica, anionic silane-coated silica, and PEI-silane-coated silica.

Among them, cationic (benzene) silane-coated silica, anionic silane-coated silica, and PEI-silane-coated silica are preferred from the viewpoint of enhancement of viscosity and modulus. In particular, cationic (benzene) silane-coated silica is superior also with respect to enhanced viscosity at high temperatures.

The amount of the modified nanoparticle in the VES fluid is not particularly limited, and an appropriate amount can be selected with consideration on relation with other materials to be used from the viewpoint of balance with the surfactant content, etc. For example, the amount of the modified nanoparticle in the VES fluid can be 0.01 to 5 mass %, and, for example, can be 0.1 to 1 mass %.

The silica nanoparticle in the above can enhance the viscosity of VES. According to rheological tests, when the concentration of silica is lower than 0.5%, the viscosity of VES will be enhanced up to 50%. Thus, the concentration of silica is preferably lower than 0.5% from the viewpoint of enhancement and maintenance of the viscosity of VES.

There is no limitation on methods for making the modified nanoparticle, and, for example, the modified nanoparticle can be produced in the following manner.

CAB-O-SIL™ silica (Cabot Corp.), whose general terminology is hydrophilic fumed silica, is dried under 50° C. in a vacuum oven overnight to remove water. Subsequently, 260 mg of silica is dissolved in 40 mL methanol, and ultrasonication is applied for at least 15 minutes to make the silica disperse well in methanol. Further, the resulting solution is transferred to a 200 mL round-bottom flask and the solution is bubbled with $N_2$ for at least 30 minutes. Under intensive stirring, 780 mg of a silane (including a silane derivative and silane coupling agent) is added dropwise through a syringe to react under room temperature for 24 hours. After completion of the reaction, the modified silica nanoparticle is purified by several centrifugation and redispersion cycles with the supernatant replaced by deionized water during each cycle, and the obtained silica nanoparticle is dried under vacuum at room temperature to obtain the modified nanoparticle.

(Additive)

For the VES fluid of the present embodiment, an additive can be used to provide synergistic properties to the VES so that the VES fluid has multiple actions and active compositions to enhance fluid performance. Examples of the additive include co-surfactants, anti-corrosions, anti-scalings, PH neutralizations, anti-oxidations, friction reducers, biocides, corrosion inhibitors, traces, fluid loss agents, formation stabilizers, stimuli-response properties, and breakers. In using the VES fluid of the present embodiment as a hydraulic fracturing fluid, the viscosity is mainly achieved by control of concentrations towards higher-order micelle structure, and hence use of a breaker is not essential in recovery. Accordingly, the surfactants in the VES fluid of the present embodiment can be easily recovered.

The amount of the additive in the VES fluid is not particularly limited, and an appropriate amount can be selected with consideration on relation with other materials to be used from the viewpoint of balance with the surfactant content, etc.

<<Use of Viscoelastic Surfactant Fluid Composition>>

As described above, the VES fluid of the present embodiment is suitable for oilfield applications, and is useful also for, for example, a hydraulic fracturing fluid, a drilling fluid, acid treatment, enhanced oil recovery (EOR), and other oilfield applications which require a viscosified medium. The VES fluid of the present embodiment can be used, for example, for well stimulation, a completion fluid, a drilling fluid, a hydraulic fracturing fluid, acid stimulation, and enhanced oil recovery.

Complexes with higher-order micelles can be observed in the VES fluid of the present embodiment. The complexed VES is inferred to preferentially have a leak-off rate (fluid loss properties) which is below the leak-off rate of pure VES fluids of equivalent rheology.

This is expected to give a significant advantage as a VES fluid, and as a result the VES fluid of the present embodiment can be used to fracture higher-permeability formations as compared to known VES fluids. The clean-up performance of the new complex VES fluid of the present embodiment can be similar to or better than that observed for a low-concentration linear gel polymer fracturing fluid, and is inferred to be superior to higher-concentration linear polymer fluids or covalently crosslinked polymer fluids.

EXAMPLES

Hereinafter, the VES fluid of the present invention will be specifically described with reference to Examples. It should be noted that the present invention is not limited to the following Examples.

<<Materials, Instruments, and Methodology>>

<Materials>

Hexadecyltrimethylammonium bromide (CTAB) (96%), sodium salicylate (ReagentPlus, 99%) and guar gum were purchased from Sigma-Aldrich Co. LLC and used as received. CAB-O-SIL™ EH-5 untreated fumed silica (hereinafter, occasionally referred to as "Cabosil silica nanoparticle") was obtained from Cabot Corp.

Hydrochloric acid (ACS Grade, 36.5% to 38%) was purchased from VWR International. Sodium hydroxide (ACS reagent, 97%) was purchased from Sigma-Aldrich Co. LLC. (Trimethylsilyletyl)benzyltrimethyl ammonium chloride (60% in methanol) was purchased from Gelest, Inc. RDG 16/30 proppant was purchased from Preferred Sands, Inc. Other chemicals and materials used will be specifically specified as they occur within this document.

<Instruments>

—IR (FTIR)—

Infrared (IR) spectra of silica nanoparticles were recorded on a Cary 600 Series FT-IR spectrometer purchased from Agilent Technologies, and the scanning range was 4000 to 400 $cm^{-1}$.

—DLS—

Dynamic light scattering (DLS) and zeta potential were measured using a Mobius equipped with Mobius Dip Cell (Wyatt Technology Corporation).

—Rheological and Viscosity Properties—

Study of the rheological and viscosity properties of the fluids was made with a HAAKE MARS 3 rheometer (Thermo Electron Corporation, Karlsruhe, Germany) in the parallel measuring geometry (diameter: 35 mm).

—TGA—

Thermogravimetric analysis (TGA) was performed using a Q500 TGA (TA instruments, Inc.).

—Deionized Water—

A Millipore-Q-gard was used to obtain deionized water.

<Methodology>

—Dynamic Light Scattering (DLS) and Zeta Potential—

In water, 0.1 wt. % of silica was dispersed and ultrasonicated for 15 minutes. The solution was directly added to the Mobius dip cell to test.

—Viscosity Measurements—

At temperatures of 40° C. or lower, viscosity measurements were made with a HAAKE MARS 3 rheometer (Thermo Electron Corporation, Karlsruhe, Germany) in the parallel plate geometry (diameter: 35 mm). The plate was pre-heated to specific temperature and around 1 mL of fluid was placed on the center of the plate. Then the gap between the plates was adjusted to 1 mm, and the excessive fluid was removed. Measurements were performed with a shear rate ramp from 0.1 $s^{-1}$ to 100 $s^{-1}$.

At temperatures higher than 40° C., a "Grace M5600" was used for viscosity measurements.

—Rheology Measurements—

Rheology measurements were made with a HAAKE MARS 3 rheometer (Thermo Electron Corporation, Karlsruhe, Germany) in the parallel plate geometry (diameter: 35 mm). The plate was pre-heated to specific temperature and around 1 mL of fluid was placed on the center of the plate. Then the gap between the plates was adjusted to 1 mm, the excessive fluid was removed. Measurements were performed with a frequency ramp from 0.1 Hz to 10 Hz.

Rheology is an important method to distinguish the viscoelastic properties of VES materials in terms of contributions of bulk and storage modulus and loss modulus. G' and G" are two important parameters together with the tan delta.

—Proppant Stability Test in VES (Slurry Bed Height)—

With VES, 5 ppg of raw sand (size: 20/40) was mixed, and placed in a volumetric tube. The mixture was placed under room temperature and left to stand for 24 hours. At specific time, a picture was taken and the bed height was recorded and plotted with time.

—Proppant Pack Flow Test—

A proppant pack flow (PPF) test was made by using a tube system from Swagelok Company. To a cylinder, 40 mL of fluid (VES, guar fluid) was added, and the cylinder was blocked with a ball valve. 30 g of Preferred Sand RDG 16/30 was added to a column with a steel mesh (Grainger, 150 mesh) placed on the bottom. The column was connected with the cylinder and the whole system was wrapped with a heating tape controlled by a Glas-Col Powrtrol system and heated to specific temperature (for 80° C. measurements). The system was pressurized to 30 psi and the flow rate of the fluid was recorded.

Example 1

(Modified Nanoparticles and VES Enhancement Study)

Study Example 1

A VES fluid containing 3% of a surfactant (VES: CTAB), 0.5% of sodium salicylate, and water was used, and the viscosity and G', G" (20°C) of such VES fluids each containing 0.4 mg/mL of any of the following nanoparticles and modified nanoparticles were measured.

Sample 1: raw nanoclay (Comparative Example)
Sample 2: polydiallyl dimethyl ammonium chloride (PDADMAC)-modified nanoclay (mass ratio: 1:1) (Example)
Sample 3: raw silica
Sample 4: PCIMETA-modified silica (Example)

As demonstrated in the following, all the VES fluids, except for that with the PDADMAC-modified nanoclay, exhibited a slight improvement of the viscosity and G'. However, the samples using other than the PDADMAC-modified nanoclay did not show much difference in improvement in viscosity at this stage. In contrast, the nanoclay with PDADMAC demonstrated a decreasing of viscosity. This could be due to the fact that the nanoclay and PDADMAC only formed an intercalation structure rather than exfoliated the clay layers, which is consistent with an AFM result (not shown). The results are shown in FIGS. 4A-4C.

Study Example 2

(Preparation of Modified Nanoparticles)

Modified nanoparticles shown in the following table were prepared and subjected to measurements.

Alkyl silane—silica 1 (+):cationic silane-coated silica

Modified nanoparticle obtained by modifying silica (Cabosil silica nanoparticle) with N-(Trimethoxysilyl) propyl-N,N,N-trimethylammonium chloride Alkyl silane—silica 4 (−):anionic silane-coated silica Modified nanoparticle obtained by modifying silica (Cabosil silica nanoparticle) with N-(Trimethoxysilylpropyl) ethylenediaminetriacetate tripotassium salt Silica PEI (+):PEI-silane-coated silica Modified nanoparticle obtained by modifying silica (Cabosil silica nanoparticle) with Dimethyoxysilymethylpropyl modified Polyethylenimine Silica 2 (+):cationic (benzene) silane-coated silica Modified nanoparticle obtained by modifying silica (Cabosil silica nanoparticle) with 4-(Trimethoxysilylethyl) benzyltrimethylammonium chloride (Alkyl silane—silica 1 (+):cationic silane-coated silica)

Figure 5C:
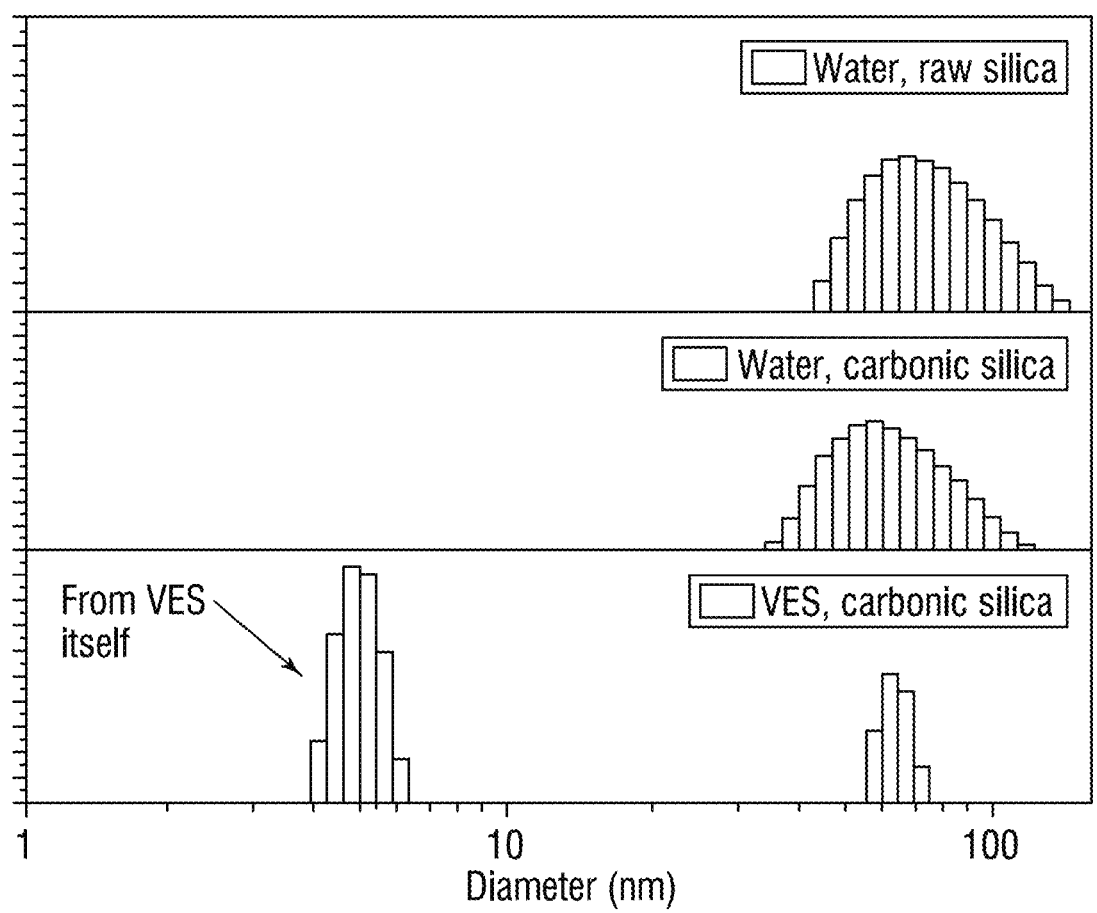

FIGS. 5A-5C show the results of IR, DLS, and TGA studies on alkyl silane—silica 1 (+):cationic silane-coated silica.

Dynamic light scattering ("DLS") measurement of the silane-coated silica confirmed that nanoparticles were dispersed well in the water. Comparison of the raw silica and the cationic silane-coated silica found that the sizes were almost the same, 65 nm. After preparing the VES fluid, the size of the nanoparticles remained. Accordingly, the presence of the peak occurring at around 6 nm comes from the VES (surfactant) itself. Herein, a mono-dispersed nanoparticle was used in the VES solution.

(Alkyl Silane—Silica 4 (−): Anionic Silane-Coated Silica)

FIGS. 6A and 6B show the results of IR and DLS studies on alkyl silane—silica 4 (−): anionic silane-coated silica.

IR and DLS studies were done on alkyl silane—Silica 4: (−) anionic silane-coated silica. The FTIR result confirmed the successful coating of the silane on the silica nanoparticles. The DLS result confirmed the mono-dispersed particles in water.

(Silica PEI (+): PEI-Silane-Coated Silica)

FIGS. 7A and 7B show the results of IR and TGA studies on silica PEI (+): PEI-silane-coated silica.

IR and TGA studies were done on silica PEI (+): PEI-silane-coated silica. The FTIR and TGA results confirmed the successful coating of the silane on the silica nanoparticles.

(Silica 2 (+): Cationic (Benzene) Silane-Coated Silica)

FIGS. 8A and 8B show the results of IR and TGA studies on silica 2 (+): cationic (benzene) silane-coated silica.

IR and TGA studies were done on silica 2 (+): cationic (benzene) silane-coated silica. The FTIR and TGA results confirmed the successful coating of the silane on the silica nanoparticles.

Study Example 3

(Studies on VES Fluids)

VES fluids each containing 3% of a surfactant (VES: CTAB), 0.5% of sodium salicylate, 0.1% of any of the following nanoparticles or modified nanoparticles, and water were used for measurements.
 Sample 10: VES only (Comparative Example)
 Sample 11: raw silica (Comparative Example)
 Sample 12: cationic (benzene) silane-coated silica (Silica 2 (+): modified nanoparticle (Example))
 Sample 13: anionic silane-coated silica (Silica 4 (−): modified nanoparticle (Example))
 Sample 14: cationic silane-coated silica (Silica 1 (+): modified nanoparticle (Example))
 Sample 15: PEI-silane-coated silica (Silica PEI (+): modified nanoparticle (Example))

—Rheological Studies (Viscosity at 20° C.)—

FIGS. 9A and 9B show the results of rheological studies (20° C.) on the various samples with silane-coated silica.

Rheological studies (20° C.) were made on the samples.

According to the results of the rheological studies, the samples except for the cationic silane-coated silica nanoparticle (sample 14) and PEI-silane-coated silica (sample 15) demonstrated the enhancement of viscosity at 20° C. over the sample 10 with the VES (surfactant only).

While the sample 11, prepared by adding raw silica to the sample 10 (VES only), was found to exhibit the enhancement of viscosity to some degree over the sample 10, the cationic (benzene) (sample 12) and anionic silane-coated silica (sample 13) further increased the viscosity at 20° C.

On the other hand, the cationic silane-coated silica (sample 14) decreased the viscosity. The PEI-silane-coated silica (sample 15) kept the viscosity at a level similar to that of the sample 1.

—Rheological Studies (G' and G" at 20° C.)—

Figure 10A:
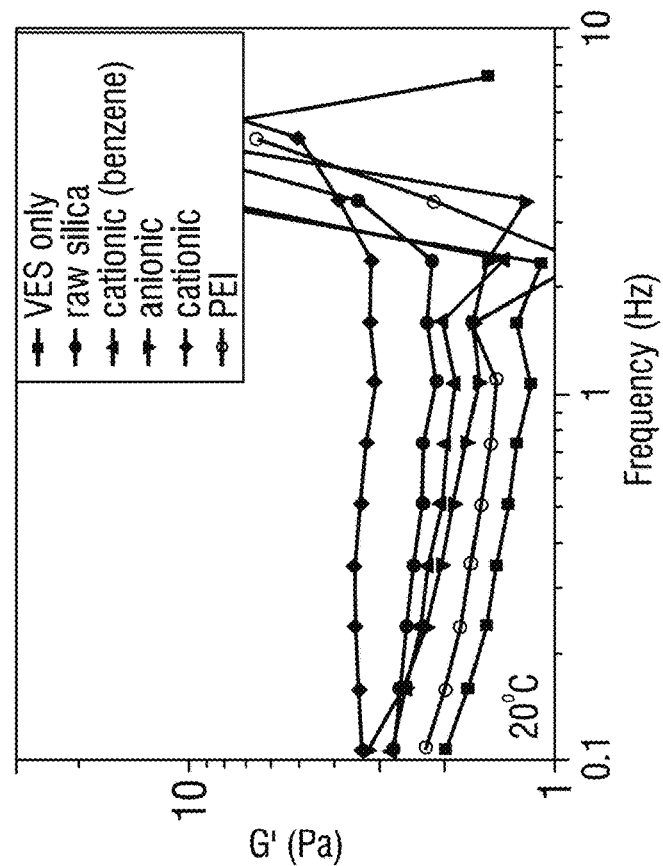
FIGS. 10A-10B show the results of rheological studies on the various samples with silane-coated silica and their G' and G" plots.
Figure 10B:
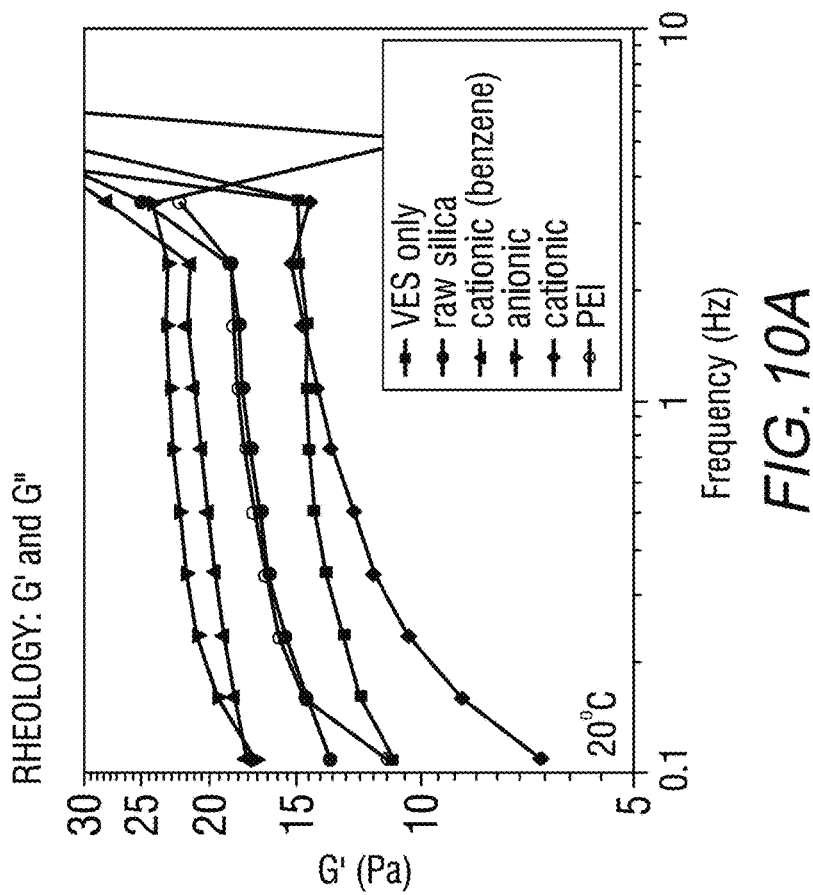

FIGS. 10A and 10B show rheological studies on the various samples with silane-coated silica and their G' and G" plots.

According to the results, the samples except for the cationic silane-coated silica (sample 14) demonstrated the enhancement of G' at 20° C. over the sample 10 (VES only).

The anionic silane-coated silica (sample 13) increased the G' in the largest scale. Further, the cationic (benzene) (sample 12) also largely increased the G'.

In contrast, the G" was found to be enhanced for all the samples over the sample 10, and the enhancement by the cationic silane-coated silica (sample 14) was the largest among them.

—Viscosity Studies (Viscosity at 30° C.)—

FIGS. 11A and 11B show viscosity studies (30° C.) on the various samples with silane-coated silica.

Viscosity studies (30° C.) were made on the various samples.

As shown above, at 30° C., the increase in viscosity was still noticeable for the samples 11 to 13 over the sample 10 (VES only), which was similar to the results at 20° C.

On the other hand, the sample 14 (cationic silane-coated silica) demonstrated decrease in viscosity at 30° C. over the sample 10, which was in similar to the result at 20° C., while the sample 15 (PEI-silane-coated silica) was found exhibit increase in viscosity over the sample 10, which was in contrast to the result at 20ºC.

—Viscosity Studies (G' and G" at 30° C.)—

These show the G" behavior acquired from viscosity studies on the various samples with silane-coated silica.

As shown in FIGS. 12A and 12B, at 30° C., the sample 13 (anionic silane-coated silica) demonstrated the best enhancement in both G' and G" over the sample 10 (VES only).

On the other hand, the sample 14 (cationic silane-coated silica) demonstrated a decrease in both G' and G" over the sample 10.

The samples 11, 12, and 15 showed a general increase in G' and G". Thus, almost similar behavior was found in elastic and bulk modulus transitions behavior.

—Viscosity Studies (Viscosity at 40° C.)—

These show the results of viscosity studies (40° C.) on the various samples with silane-coated silica.

Viscosity studies (40° C.) were made on the various samples.

Figures 13A, 13B:
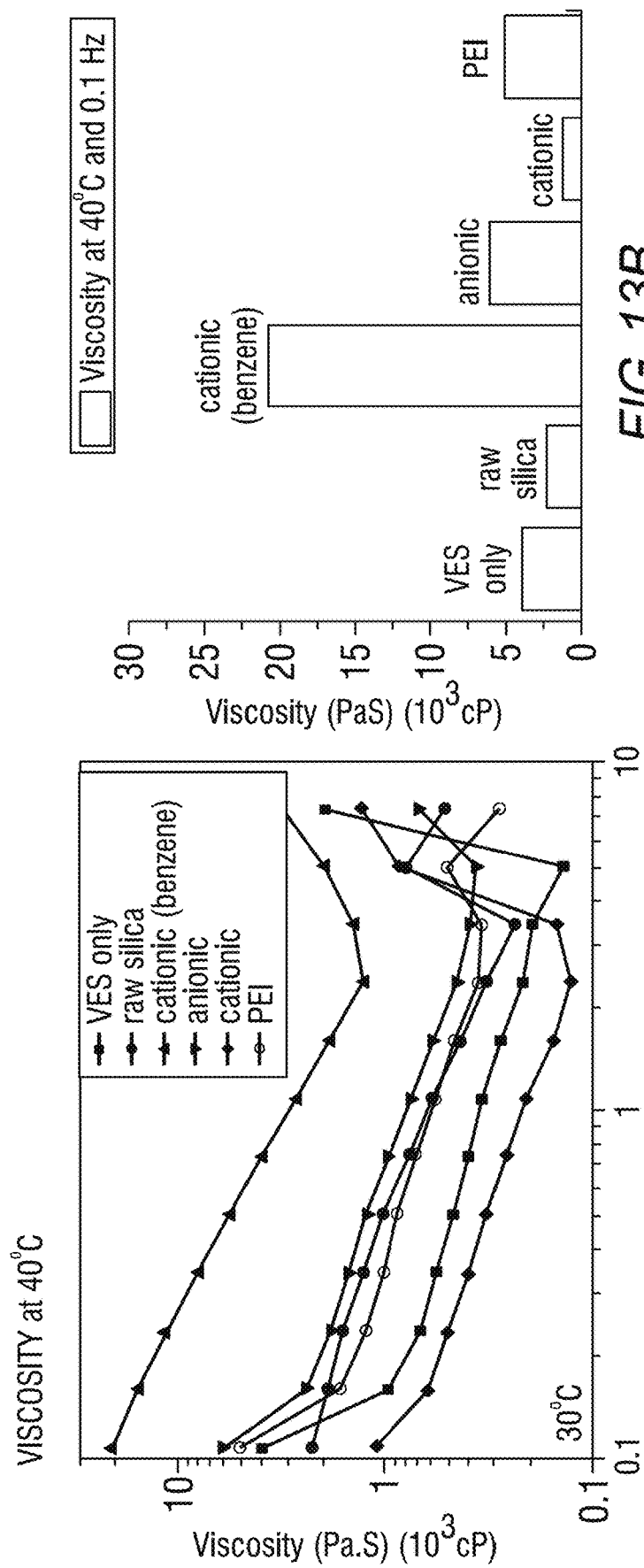
FIGS. 13A-13B show the results of viscosity studies on the various samples with silane-coated silica.

As shown in FIGS. 13A and 13B, at 40° C., the sample 12 (cationic (benzene) silane-coated silica) demonstrated the best enhancement in viscosity over the sample 10 (VES only).

In comparing other samples with the sample 10, the sample 13 (anionic silane-coated silica) demonstrated a slight enhancement in viscosity. Meanwhile, the viscosity of the sample 15 (PEI-silane-coated silica) was equal to that of the sample 10.

—Viscosity Studies (G' and G" at 40° C.)—

These show the G" behavior acquired from viscosity studies (40° C.) on the various samples with silane-coated silica.

As shown in FIGS. 14A and 14B, at 40° C., the sample 12 (cationic (benzene) silane-coated silica) demonstrated the largest increase in G' over the sample 10 (VES only).

The samples other than the sample 14 (cationic silane-coated silica) generally demonstrated the increase in G' and G" over the sample 10. Thus, almost similar behavior was found in elastic and bulk modulus transitions behavior.

Study Example 4

Further studies were made on the cationic (benzene) silane-modified silica as shown in FIGS. 15A-15D.

As mentioned above, further studies were made on the cationic (benzene) silane-modified silica in order to identify and confirm its grafting. The FTIR and TGA results demonstrated the successful formation of the silane layer on the surface. The DLS result demonstrated a slight increase in size, which also indicates formation of the silane layer.
(Studies on VES Fluids)

VES fluids each containing 3% of a surfactant (VES: CTAB), 0.5% of sodium salicylate, any of the following nanoparticles or modified nanoparticles, and water were used for measurements. Hereinafter, Cabosil silica and Ludox silica (produced by Sigma-Aldrich Co. LLC, LUDOX AS-40 colloidal silica) are occasionally referred to as "silica A" and "silica B", respectively.

Sample 10: VES only (Comparative Example)
Sample 21: silica A modified with the silane 1 below (1%) (modified nanoparticle (Example))
Sample 22: silica B modified with the silane 1 below (1%) (modified nanoparticle (Example))
Sample 23: silica A modified with the silane 1 below (0.1%) (modified nanoparticle (Example))
Sample 24: silica A modified with the silane 1 below (0.5%) (modified nanoparticle (Example))
Sample 31: silica A modified with the silane 2 below (1%) (modified nanoparticle (Example))

—Viscosity Testing—

FIGS. 16A and 16B show the results of viscosity measurements (20° C. or 40° C.) of the modified Cabosil silica nanoparticles and Ludox nanoparticles modified with the silane 1 or silane 2.

The trend of the results described above was consistent with the results of Study Example 3. The Cabosil silica (silica A) demonstrated a large increase in viscosity over the sample 10 (VES only) in any temperature region.

On the other hand, at room temperature (20° C.), the Ludox silica (sample 22) did not show much increase in viscosity. At 40°C, the Cabosil silica and Ludox silica both demonstrated the increase in viscosity.

—Rheological Testing—

Figure 17A:
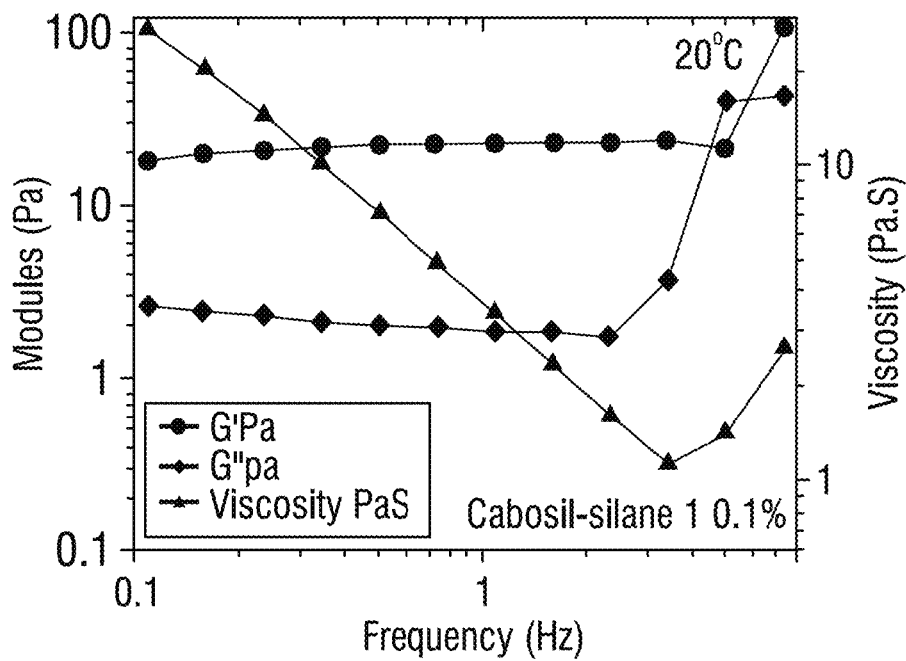
FIGS. 17A-17C show the results of rheological testing for the nanoparticles with the Carbosil silica modified with silane 1 or silane 2.
Figure 17B:
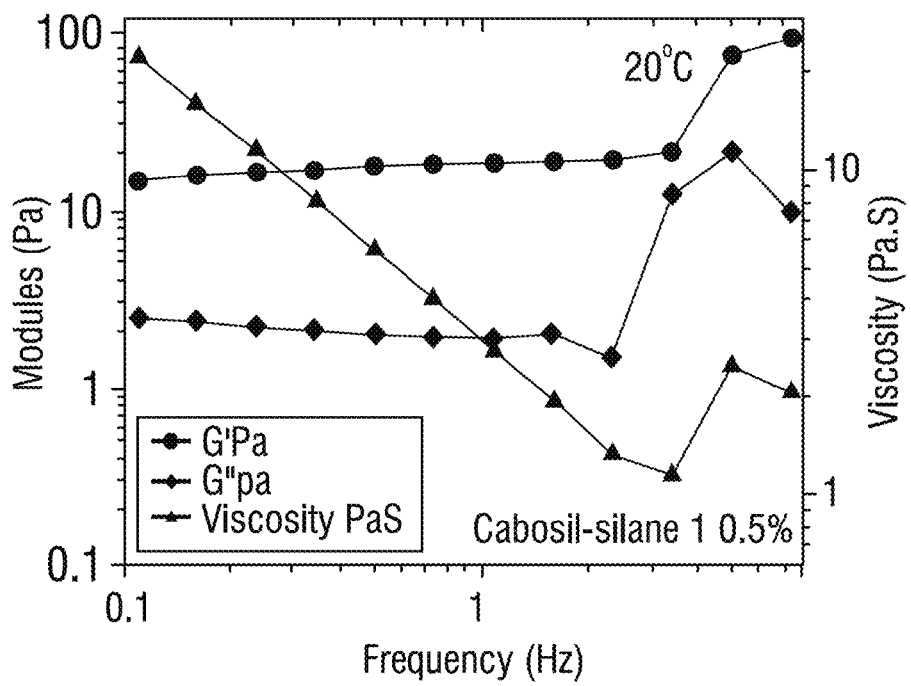
Figure 17C:
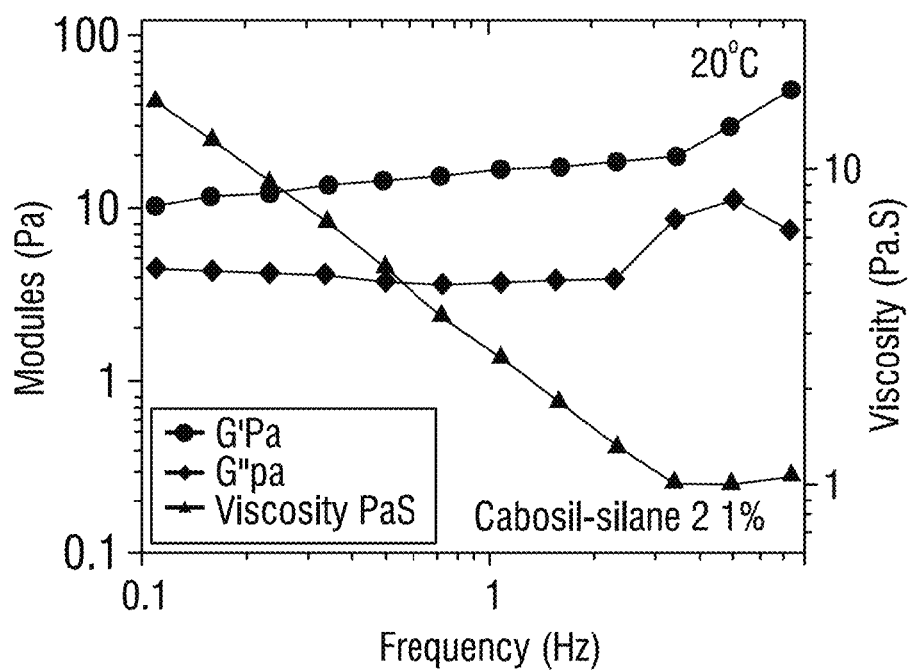

FIGS. 17A-17C show the results of rheological testing for the nanoparticles with the Cabosil silica modified with the silane 1 or silane 2.

As shown above, the results from rheological testing were consistent with those from the viscosity test. Specifically, the moduli of the VES fluids using the nanoparticle with the Cabosil silica (silica A) modified with the silane 1 (Samples 23 and 24) were higher than that of the VES fluid using the nanoparticle with Cabosil silica-silane 2 modification (sample 31).

On the other hand, the G' of each of the sample 23 and the sample 24 was higher than that of the sample 42, while the G" of each of the sample 23 and the sample 24 was lower than that of the sample 31.

—Zeta Potential—

Figures 18A, 18B:
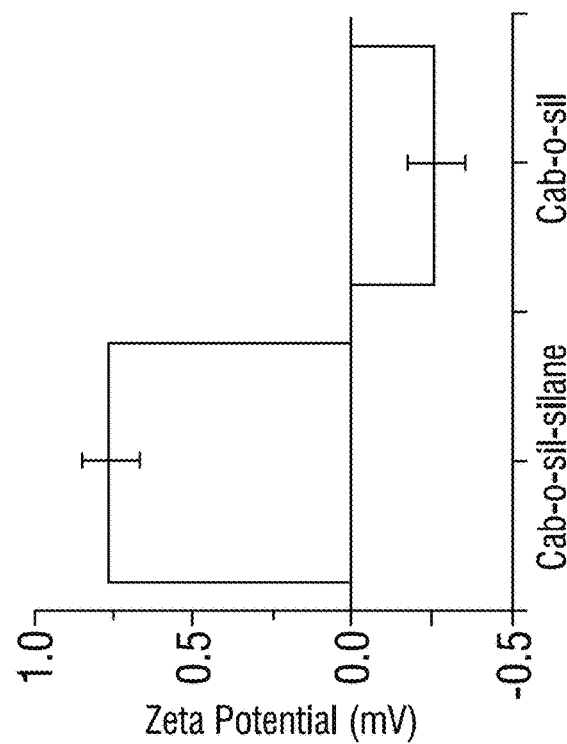
FIGS. 18A-18B show the results of zeta potential measurements showing the Carbosil silica nanoparticles modified by the cationic silane reagent.

These results of zeta potential measurements show that the Cabosil silica nanoparticle was modified by the cationic silane reagent as shown in FIGS. 18A and 18B. To confirm the presence of the positive charge on the silane 1-modified silica nanoparticle, zeta potential measurements were made, which showed that the Cabosil silica nanoparticle was sufficiently modified by the cationic silane reagent with a net positive charge.

Figures 19A, 19B, 19C:
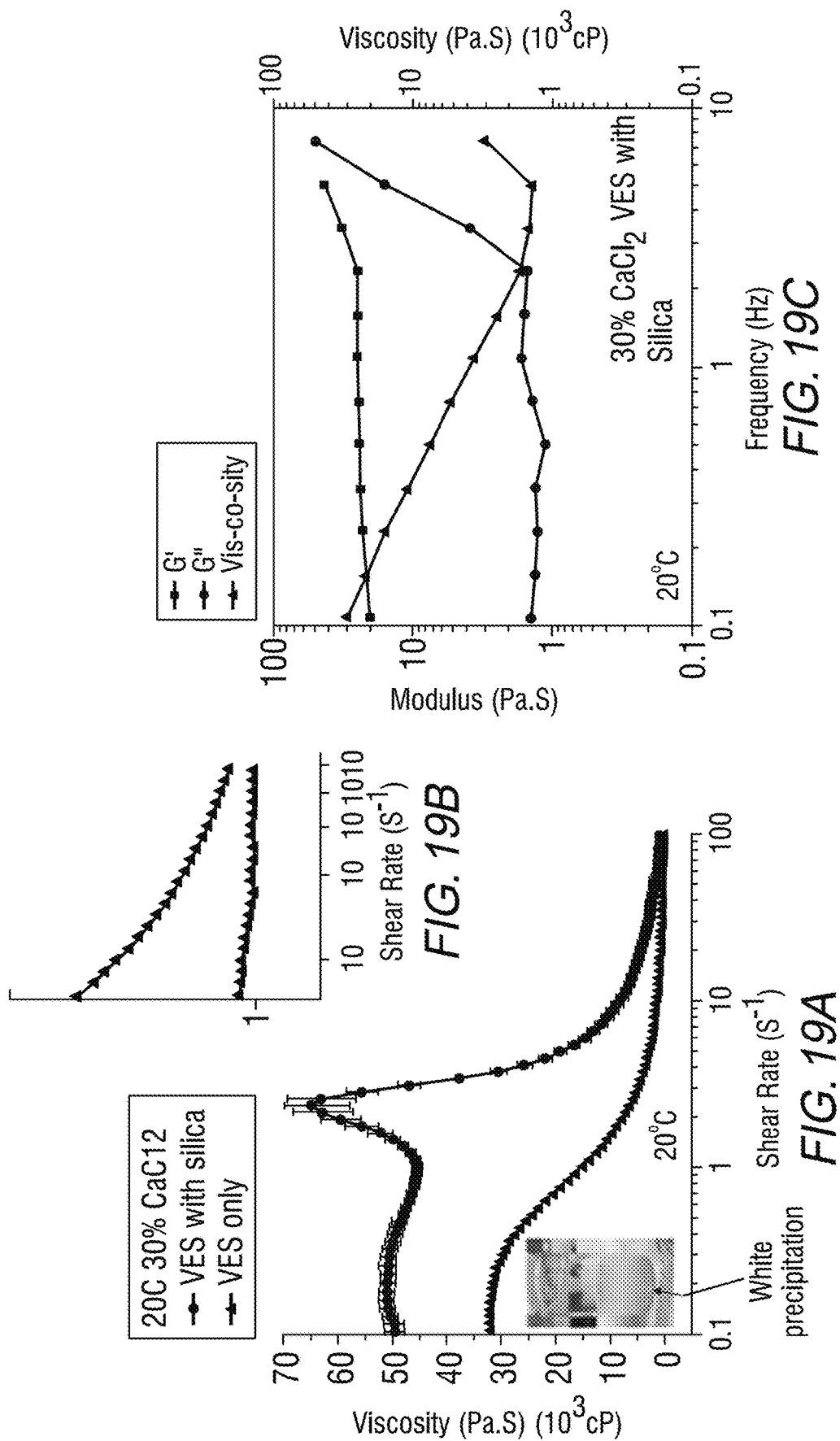
FIGS. 19A-19C show the results of high-salt stability tests on viscosity and rheology for samples with VES (CTAB: surfactant) as a control.

FIGS. 19A-19C show the results of high-salt stability tests on viscosity and rheology for samples with VES (CTAB: surfactant) as a control.

High-salt condition stability tests were performed as shown above. A VES fluid with VES (CTAB: surfactant) and $CaCl_2$) as a counterion was used for samples, and the silane 1-modified silica nanoparticle was added to one and was not added to the other. At a 30% condition, the VES fluid with silica demonstrated a better viscosity than the VES fluid without silica. This indicated that $CaCl_2$ would help to enhance the viscosity of the VES fluid.

However, there were still some precipitations noticed. This indicated that the $CaCl_2$) would somehow make the phase separation of the VES.

—Bed Height—

Figure 20A:
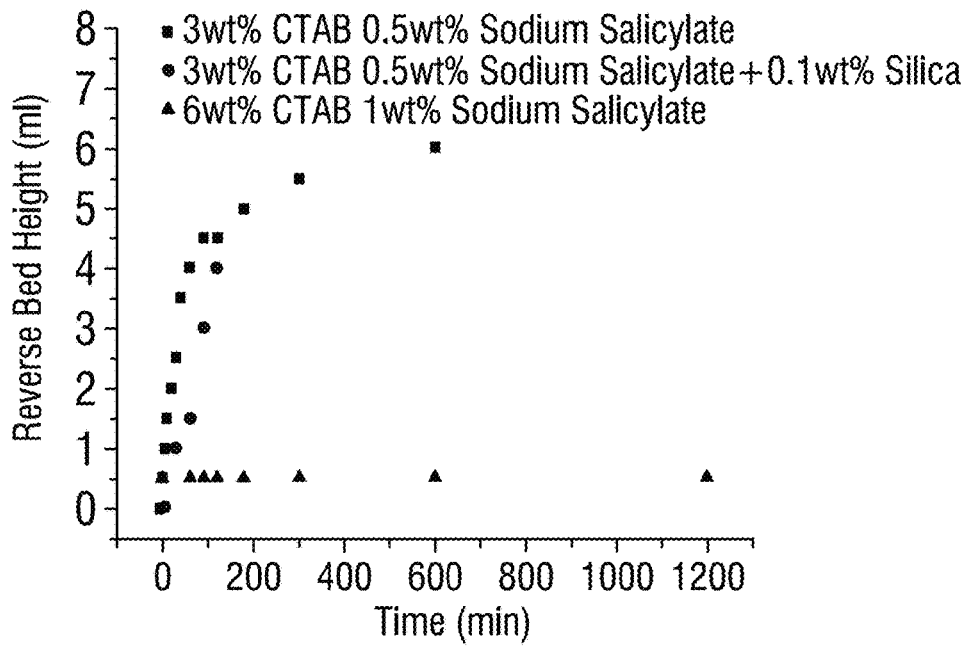
FIGS. 20A-20C show the results of slurry bed height tests with VES and silica nanoparticles.
Figure 20B:
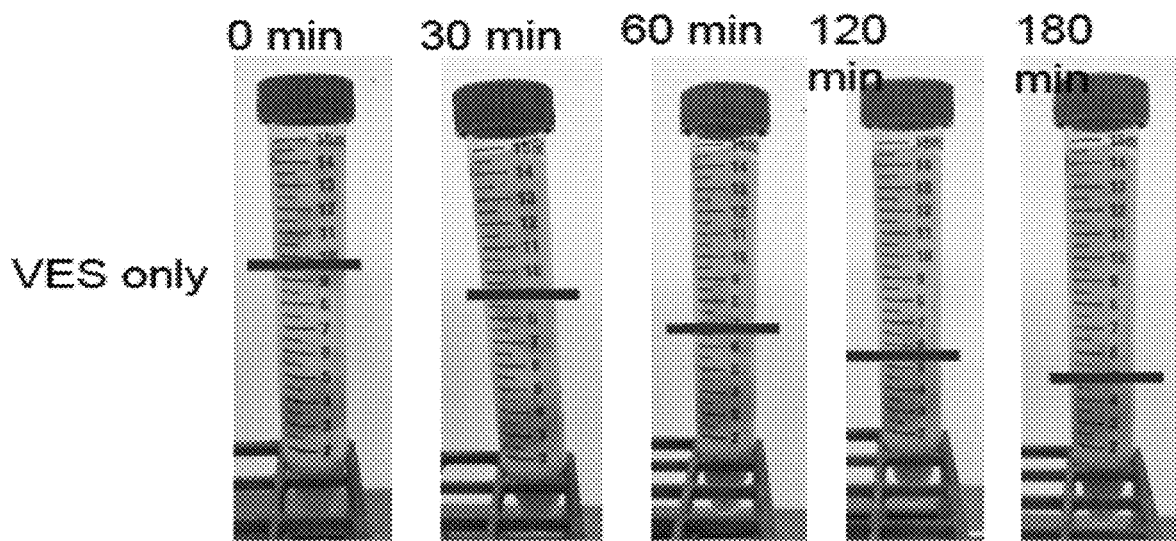
Figures 20C, 21A:
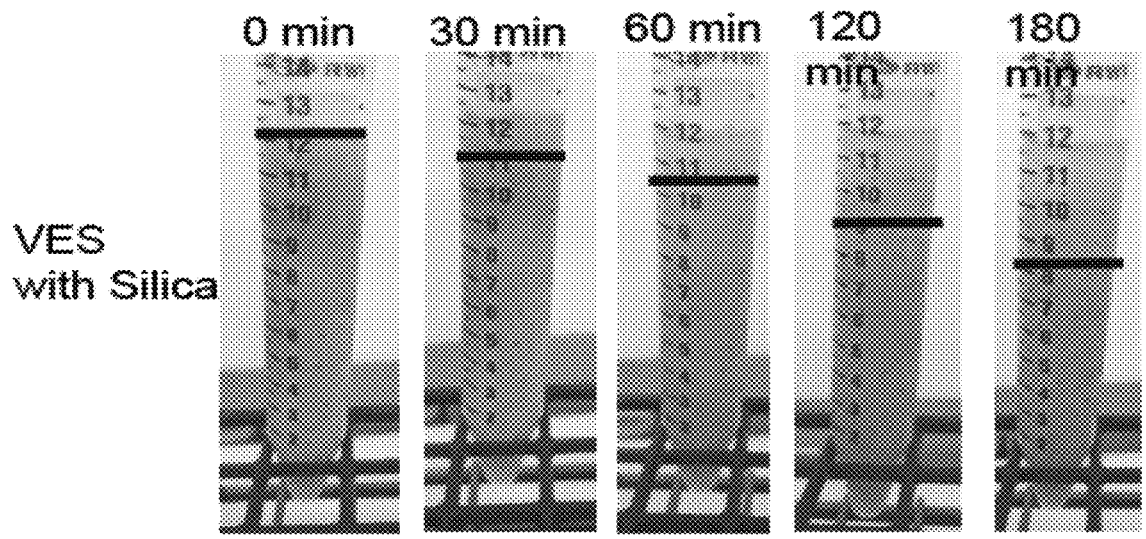
FIGS. 21A-21C show the results of the VES fluid with CTAB, NASal, and modified silica.

FIGS. 20A-20C are the results of slurry bed height tests with VES and silica nanoparticles.

Slurry bed height tests were performed with VES and silica nanoparticles.

The following samples were used.

Sample 40: 3 wt. % CTAB+0.5 wt. % sodium salicylate

Comparative Example

Sample 41: 3 wt. % CTAB+0.5 wt. % sodium salicylate+ 0.1 wt. % silane 1-modified Cabosil silica (Example)
Sample 42: 6 wt. % CTAB+1.0 wt. % sodium salicylate Comparative Example The result of the VES fluid with the silica nanoparticle (sample 41) was similar to that of the sample 40. The sedimentation of the sample 40 was slightly faster than that of the VES with the silica nanoparticle (sample 41). This is inferred to be related to the viscosity of VES fluid. With the enhancement of silica nanoparticles, the viscosity increases, and therefore the stability of the slurry is enhanced.

—Sand-Packed Proppant Flow Pack and Permeability Testing—

A sand-packed proppant column is a flow behavior on a permeability test. In this method, the viscosity of fluid and its interaction with the proppant can be measured by controlling the amount of sand, sand size, type and pressure. The longer the time needed for the fluid to flow out is, the higher the viscosity of the fluid is.

Although the basis for a permeability test and procedure was already described above, the results will be shown again in FIGS. 21A-21C.

Figure 21B:
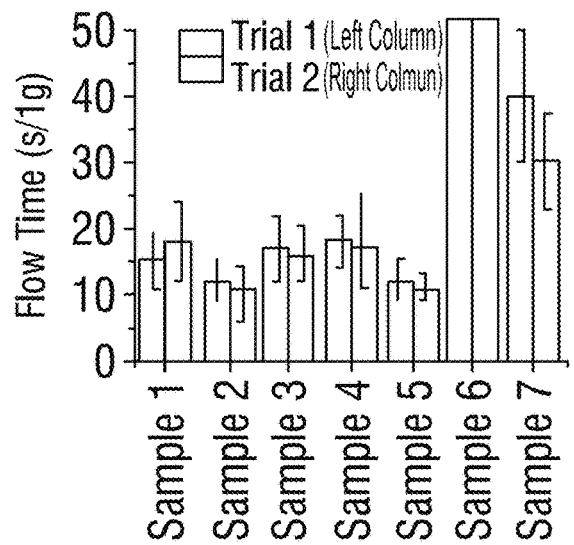
Figure 21C:
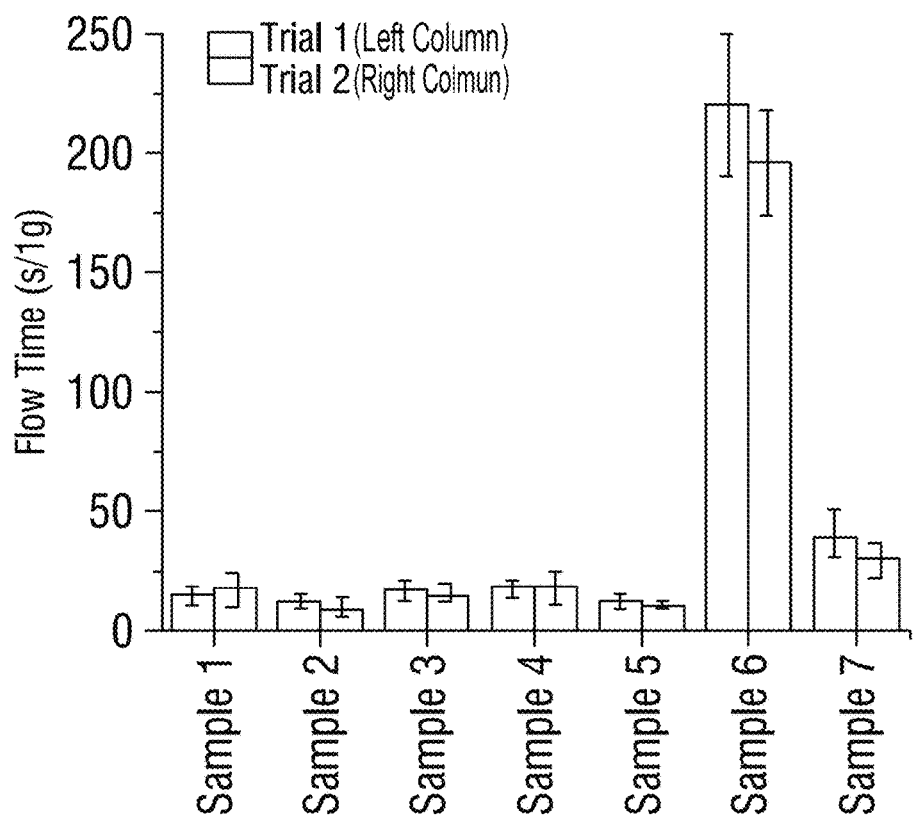

As shown in FIGS. 21A-21C, the VES fluid with CTAB, NaSal, and modified silica (cationic benzene) (sample 7) resulted in a flow time of longer than 30 seconds, and thus higher stability and viscosity. This indicated that the addition of modified silica (cationic benzene) provided higher stability and viscosity. This is presumably because it took much longer time before the fluid started flowing.

Example 2

Behavior was compared between VES with unmodified silica (the left graph below) and VES with cationic (benzene) silica as an additive. Shear-thinning and temperature-dependent behavior (400 psi) measurements were made. This indicates almost the same performance as crosslinked guar in temperature-dependent viscosity. Sample conditions were set to 6 wt. % CTAB+1 wt. % sodium salicylate+0.1 wt. % silica. Crosslinked guar was used with 0.5 wt %. In the present Example, a rheometer (Grace M5600) for high-temperature measurement of viscosity from Grace Instrument was used.

Figure 22A:
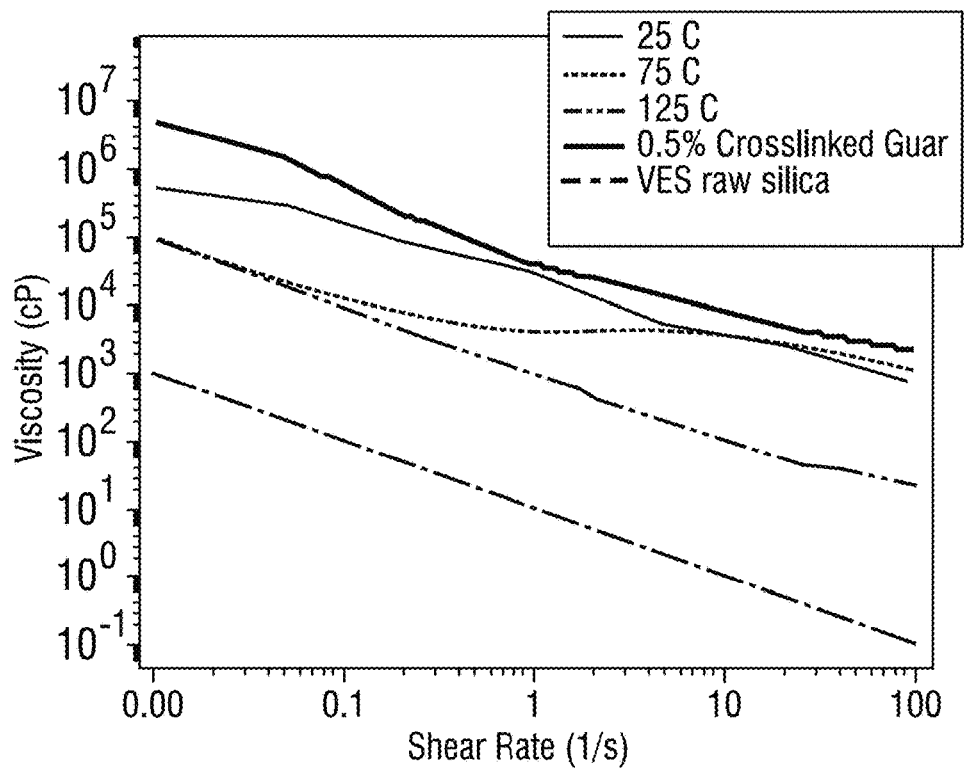
FIGS. 22A-22B show comparison on behavior between VES with unmodified silica as an additive and VES with cationic benzene silica as an additive.
Figure 22B:
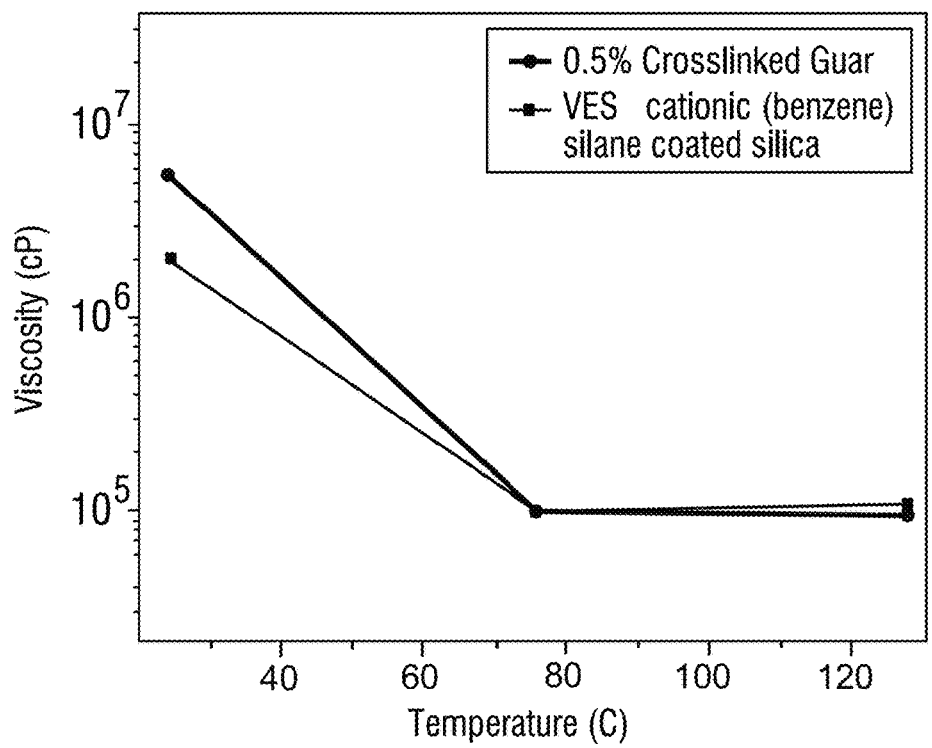

FIGS. 22A and 22B show comparison on behavior between VES with unmodified silica as an additive (the left graph) and VES with cationic benzene silica as an additive. The left graph shows shear-thinning (400 psi) and the right graph shows temperature-dependent behavior (400 psi). This indicates almost the same performance as crosslinked guar in temperature-dependent viscosity.

As shown in the above results, the VES fluid with raw silica exhibited a large decrease in viscosity at 125°C, to a degree such that normal measurement was difficult. In contrast, the viscosity of the VES fluid with the cationic (benzene) silane-coated silica at 125° C. was comparable to that of the crosslinked guar, and the viscosity was measurable even under a high temperature of 125° C.

From these results, it is inferred that modification of the surface of silica with cationic (benzene) silane stabilized the gel structure of VES and largely improved the properties at high temperatures.

If being improved in dispersibility, nanoclays and the like are similarly expected to be capable of exerting improving effect on viscosity properties in high-temperature measurements.

The invention claimed is:

1. A viscoelastic surfactant fluid composition, comprising:
   a surfactant;
   a counterion; and
   a modified nanoparticle comprising at least one selected from the group consisting of a modified silica nanoparticle, modified graphene nanoparticle, and modified nanocellulose nanoparticle,
   wherein the counterion comprises sodium naphthalene-2,3-dicarboxylate.

2. The viscoelastic surfactant fluid composition according to claim 1, wherein the modified nanoparticle is a modified silica nanoparticle, modified graphene nanoparticle, or modified nanocellulose nanoparticle.

3. The viscoelastic surfactant fluid composition according to claim 2, wherein an average particle size of the modified nanoparticle is from 0.1 nm to 1000 nm.

4. The viscoelastic surfactant fluid composition according to claim 2, further comprising:
   an additive.

5. The viscoelastic surfactant fluid composition according to claim 1, wherein an average particle size of the modified nanoparticle is from 0.1 nm to 1000 nm.

6. The viscoelastic surfactant fluid composition according to claim 1, further comprising:
   an additive.

7. The viscoelastic surfactant fluid composition according to claim 1, wherein the surfactant is hexadecyltrimethylammonium bromide.

8. The viscoelastic surfactant fluid composition according to claim 1, wherein the counterion comprises sodium naphthalene-2,3-dicarboxylate in a concentration of from 1 to 2 wt. % with respect to the surfactant.

9. The viscoelastic surfactant fluid composition according to claim 1, wherein an average particle size of the modified nanoparticle is from 1 nm to 500 nm.

10. The viscoelastic surfactant fluid composition according to claim 1, wherein an average particle size of the modified nanoparticle is from 1 nm to 100 nm.

11. A method of using a viscoelastic surfactant fluid composition, the method comprising:
    applying the viscoelastic surfactant fluid composition of claim 1 in at least one selected from the group consisting of well stimulation, a completion fluid, a drilling fluid, a hydraulic fracturing fluid, acid stimulation, and enhanced oil recovery.

* * * * *